United States Patent [19]

Tanaka et al.

[11] Patent Number: 4,868,597
[45] Date of Patent: Sep. 19, 1989

[54] PHOTOGRAPHIC CAMERA HAVING A PIEZO-ELECTRIC ACTUATING ELEMENT

[75] Inventors: Yoshihiro Tanaka; Sadafusa Tsuji, both of Osaka; Yoshiaki Hata, Nishinomiya; Manabu Inoue, Kobe; Hiroshi Ootsuka, Sakai; Michihiro Iwata, Sakai; Fumiaki Ishito, Sakai; Koh Hayama, Sakai, all of Japan

[73] Assignee: Minolta Camera Kabushiki Kaisha, Osaka, Japan

[21] Appl. No.: 243,129

[22] Filed: Sep. 8, 1988

Related U.S. Application Data

[63] Continuation of Ser. No. 13,561, Feb. 11, 1987, abandoned.

[30] Foreign Application Priority Data

Feb. 12, 1986 [JP] Japan .................................. 61-29399

[51] Int. Cl.$^4$ ............................................. G03B 7/08
[52] U.S. Cl. .................................... 354/457; 354/418; 354/453; 354/227.1
[58] Field of Search ................ 354/418, 435, 439, 441, 354/446, 453, 456, 457, 227.1

[56] References Cited

U.S. PATENT DOCUMENTS

| | | |
|---|---|---|
| 4,126,877 | 11/1978 | Ohtaki et al. . |
| 4,190,336 | 2/1980 | Frank et al. . |
| 4,190,344 | 2/1980 | Ishiguro et al. . |
| 4,214,827 | 7/1980 | Tominaga et al. . |
| 4,291,958 | 9/1981 | Frank et al. . |
| 4,407,573 | 10/1983 | Wakabayashi et al. . |
| 4,464,039 | 8/1984 | Ishida ................................ 354/418 |
| 4,549,799 | 10/1985 | Inagaki . |
| 4,603,954 | 8/1986 | Egawa et al. . |
| 4,609,275 | 9/1986 | Ishiguro ............................. 354/453 |
| 4,676,625 | 6/1987 | Alyfuku . |
| 4,751,545 | 6/1988 | Iguchi . |

FOREIGN PATENT DOCUMENTS

| | | |
|---|---|---|
| 53-95620 | 8/1978 | Japan . |
| 58-228316 | 12/1983 | Japan . |
| 59-186381 | 10/1984 | Japan . |
| 59-204014 | 11/1984 | Japan . |
| 60-12523 | 1/1985 | Japan . |
| 60-39631 | 3/1985 | Japan . |
| 60-52832 | 3/1985 | Japan . |
| 60-144726 | 7/1985 | Japan . |
| 60-159701 | 8/1985 | Japan . |

Primary Examiner—Russell E. Adams
Attorney, Agent, or Firm—Burns, Doane, Swecker & Mathis

[57] ABSTRACT

A photographic camera of the type including a piezo-electric actuating element driven by energy accumulated in a capacitor for actuating a shutter wherein the piezo-electric element operates in stability to assure accurate appropriate opening and closing operation of the shutter of the camera and the capacitor is charged up rapidly to allow subsequent photographing operation to be done in a minute. In the camera, a charged voltage of the capacitor is checked several times to determine if it is sufficient to assure proper operation of the piezo-electric element, and if a then required level is not reached, then the capacitor is charged to the required voltage. While the capacitor is being charged, charging of a capacitor for a flash is inhibited. For operation of the shutter, a negative voltage is first applied across the piezo-electric element to set the same to its fixed home position, and then a positive voltage is applied to move the shutter from the home position to a predetermined opening position, whereafter the negative voltage is applied again to return the shutter to its initial position rapidly. The position of the shutter is also checked to assure proper operation of the camera.

14 Claims, 33 Drawing Sheets

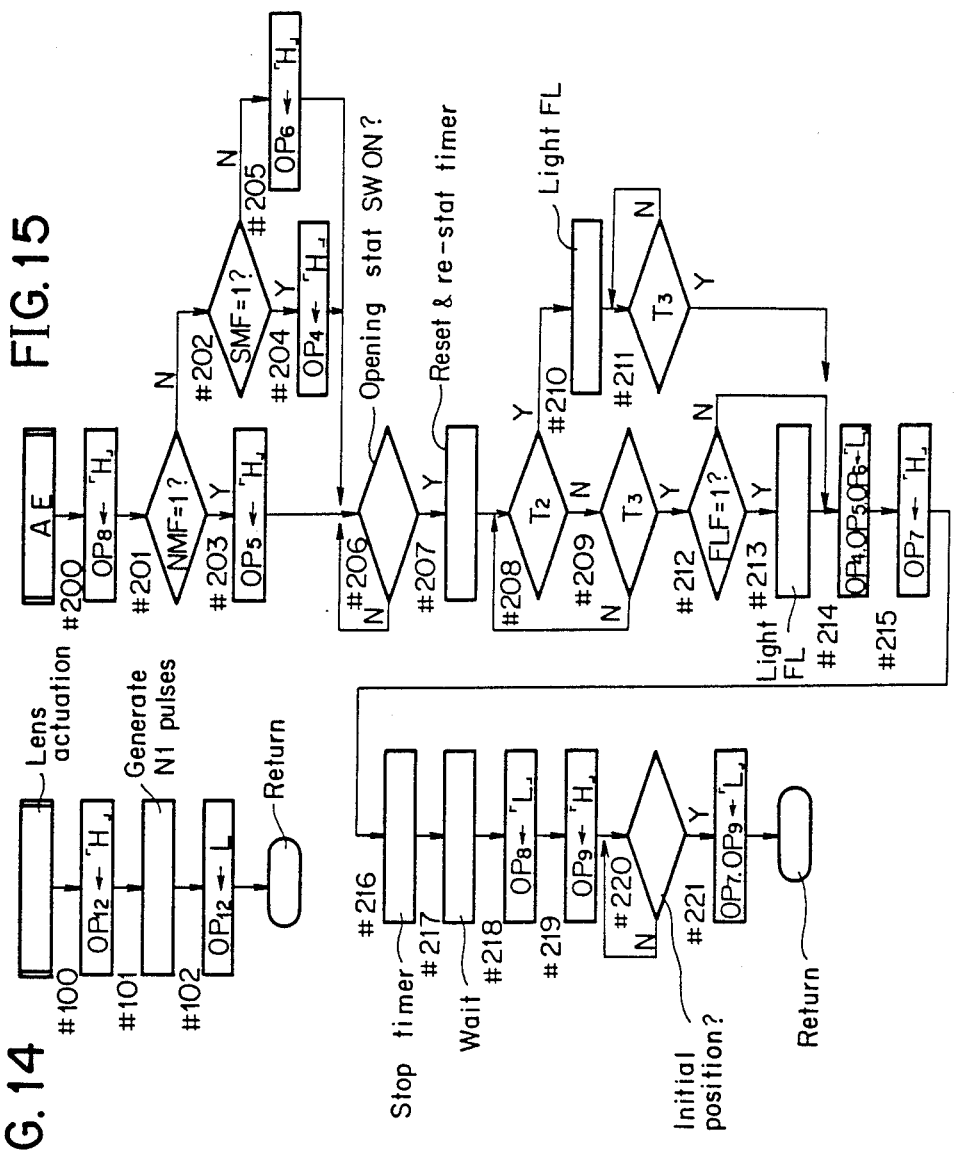

PHOTOGRAPHIC CAMERA HAVING A PIEZO-ELECTRIC ACTUATING ELEMENT

This application is a continuation of application Ser. No. 013,561 filed Feb. 11, 1987, abandoned.

BACKGROUND OF THE INVENTION

1. Field of the Invention

This invention relates to a photographic camera, and more particularly to a camera having a piezo-electric actuating element which is distorted in response to a voltage applied thereto.

2. Description of the Prior Art

Conventionally, various proposals have been made to a camera of the type wherein a piezo-electric actuating element as described above which is also known as a bimorph is employed for actuation of a photographing lens for focusing or of a shutter. Typical ones of such cameras are disclosed, for example, in Japanese Patent laid-open No. 60-144726 and in Japanese Patent Laid-open No. 59-204014.

In order to apply a stabilized high voltage across such a piezo-electric actuating element as is used for actuation of a lens or a shutter to drive the piezo-electric actuating element in stability, it may be advisable to once accumulate in a capacitor a charge of a voltage necessary to drive the piezo-electric actuating element in stability and then supply the charge thus accumulated to the piezo-electric actuating element upon actuation of the same for photographing. Further, as it is considered that subsequent photographing may be done in a moment, it is necessary that, when a subsequent photographing operation is started, the capacitor is already charged up to a voltage sufficient to drive the piezo-electric actuating element in stability because actuation of a shutter or a lens by the piezo-electric actuating element is essentially required for such photographing.

In other words, if a subsequent photographing operation is started before the capacitor is charged up to a voltage sufficient to drive the piezo-electric actuating element in stability, the lens or shutter which is connected to be actuated by the piezo-electric actuating element will not operate regularly. Accordingly, there is the possibility that photographing in error such as photographing with out of focus condition or with improper exposure may be done.

Meanwhile, a main capacitor of a flash device which is provided to supply energy for emission of light to a xenon tube of a flash for flash photographing makes a high load to a power source. Accordingly, if the capacitor for the piezo-electric actuating element is charged in simultaneous relationship with the main capacitor of a flash device, much time is required to completely charge up both the capacitors, which will disable subsequent photographing to be performed in a moment. Accordingly, such simultaneous charging of both the capacitors is not preferable.

Further, such a piezo-electric actuating element presents a following problem due to its hysteresis characteristic which is well known in the art. In particular, if it is assumed, for example, that a voltage of 0 volts is applied across a piezo-electric actuating element at an initial position and that a voltage of 200 volts is first applied across the piezo-electric actuating element in order to actuate a shutter and then the voltage of 0 volts is applied again across the piezo-electric actuating element after operation of the shutter, the piezo-electric actuating element will not return to its initial position due to its hysteresis characteristic. Accordingly, if the voltage application to the piezo-electric actuating element is controlled upon subsequent operation of the shutter on the assumption that the piezo-electric actuating element has been returned to its initial position, operation in error will occur.

SUMMARY OF THE INVENTION

It is a principal object of the present invention to provide a camera which can resolve the drawbacks described above that are derived from use of a piezo-electric actuating element for actuation of a lens or a shutter of the camera.

It is another object of the invention to provide a camera of the type including a piezo-electric actuating element which is driven by a charge accumulated in a capacitor to control a lens or a shutter of the camera, wherein the specific disadvantage described above that is derived from a photographing operation started when the capacitor for actuation of the piezo-electric actuating element is not yet charged up sufficiently.

It is a further object of the invention to provide a camera of the type including a capacitor for driving a piezo-electric actuating element and a main capacitor for driving a flash for flash photographing, wherein a defect that simultaneous charging of the capacitors will increase the time required to charge up the capacitors can be eliminated.

It is a yet another object of the invention to provide a camera of the type including a capacitor for driving a piezo-electric actuating element and a main capacitor for driving a flash for flash photographing, wherein the capacitor for driving the piezo-electric actuating element can be charged up rapidly to allow the camera to effect subsequent photographing in a moment.

It is a still further object of the invention to provide a camera wherein, before a photographing operation is started, a capacitor which is charged to supply energy to a piezo-electric actuating element that is used to actuate a shutter or a lens of the camera is charged without fail to a voltage sufficient to drive the piezo-electric actuating element in stability.

It is a still further object of the invention to provide a camera wherein opening and closing operation of a shutter can be controlled efficiently using a piezo-electric actuating element.

It is an additional object of the invention to provide a camera of the type including a shutter which serves also as an aperture diaphragm, wherein a program chart indicating a relationship between a shutter speed and an aperture value with respect to brightness of an object can be changed by changing the opening speed of the shutter.

The features of the present invention which are believed to be novel are set forth with particularity in the appended claims. The present invention, both as to its organization and manner of operator, together with further objects and advantages thereof, may best be understood by reference to the following description, taken in conjunction with the accompanying drawings.

BRIEF DESCRIPTION OF THE DRAWINGS

FIG. 14 is a flow chart illustrating a subroutine of "LENS ACTUATION" of the flow chart of FIG. 12c;

FIG. 15 is a flow chart illustrating a subroutine of "AE" of the flow chart of FIG. 12c;

FIG. 36 is a flow chart of a modified routine corresponding to FIG. 33a.

DETAILED DESCRIPTION OF THE PREFERRED EMBODIMENTS

Now, preferred embodiments of the present invention will be described in detail with reference to the drawings.

Figure 1:
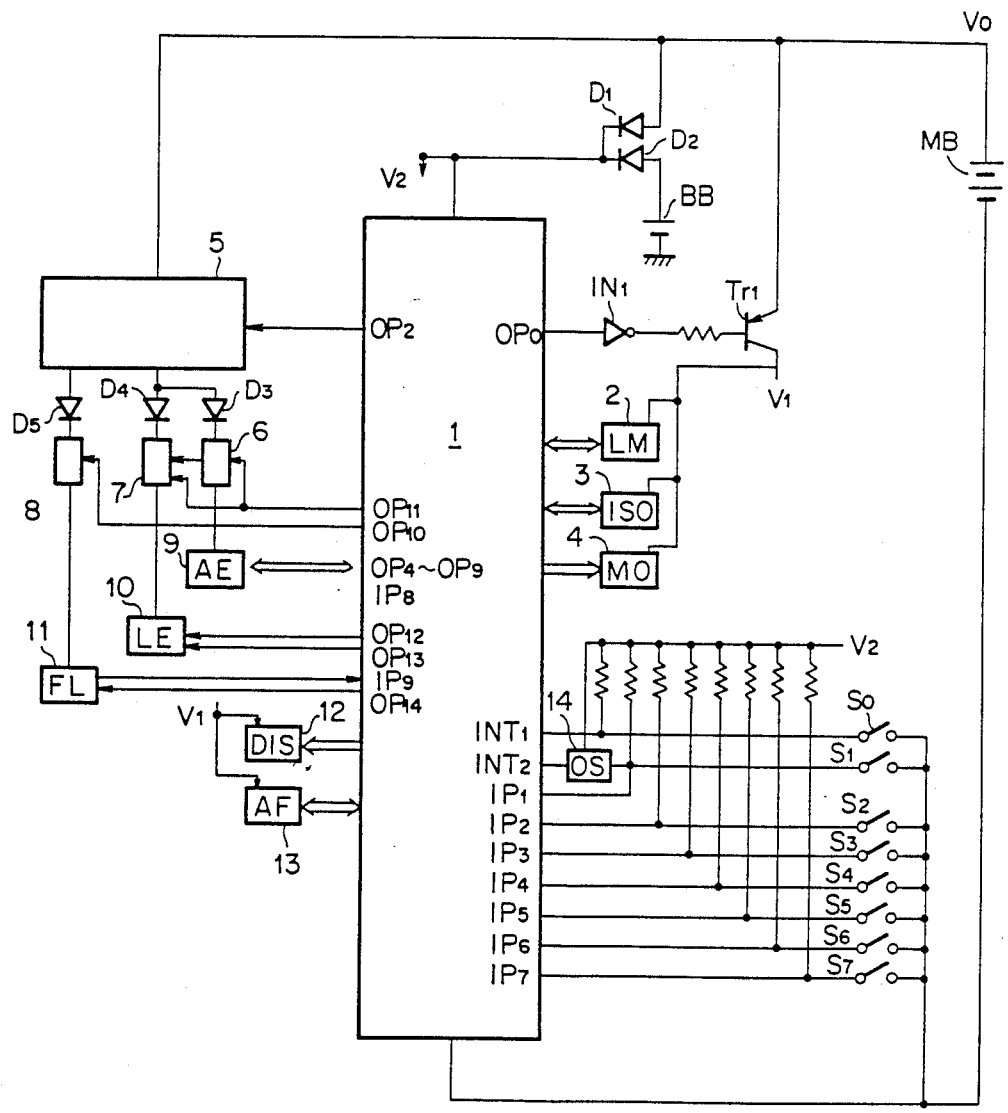
FIG. 1 is a block diagram showing an electric circuit of a camera according to a preferred embodiment of the present invention.

Referring first to FIG. 1, there is illustrated an electric circuit which is used in a camera of a preferred embodiment of the present invention. The circuit shown includes a microcomputer 1 which performs sequencing control of the camera and calculations, a photometry circuit 2 which sends a brightness value Bv corresponding to a brightness of an object as a digital signal to the microcomputer 1, a film sensitivity reading circuit 3 which sends a read film sensitivity value Sv as a digital signal to the microcomputer 1, a film winding circuit 4 including a motor for taking up a film, and a boosting circuit 5 for boosting a low voltage of a power source battery MB to high voltages. The circuit of FIG. 1 further includes switching circuits 6, 7, 8 for selectively supplying the high voltages to an exposure controlling circuit 9 for controlling the exposure of the camera in response to an exposure signal from the microcomputer 1, a lens actuating circuit 10 for actuating a lens in response to a lens actuating signal from the microcomputer 1, and a flash controlling circuit 11 for causing emission of flash light in response to a light emitting signal from the microcomputer 1, respectively.

The circuit of FIG. 1 further includes a finder display circuit 12 for providing indications of warning of a low brightness and permission of photographing within a field of view of a finder, and a distance measuring circuit 13 for measuring a distance from the camera to an object and for sending the thus measured distance as a digital signal to the microcomputer 1.

In addition to the main power source MB for supplying electric power to the entire circuitry of the camera mentioned above, the circuit of FIG. 1 further includes a back-up power source BB for supply electric power only to the microcomputer 1. The circuit further includes diodes $D_1$, $D_2$ for preventing reverse charging, and a power supply transistor $Tr_1$ which is controlled by an output terminal $OP_0$ of the microcomputer 1.

The circuit of FIG. 1 further includes various switches including a lens cover actuated switch $S_0$ which is turned on when a lens cover not shown is opened. The microcomputer 1 executes a routine named "S₀ON" described hereinbelow in response to a change of an input to an interrupt terminal $INT_1$ thereof from an H level to an L level due to turning on of the switch $S_0$.

A photometry switch $S_1$ is turned on in response to depression of a shutter release button not shown to a first stroke. The microcomputer 1 executes an interrupt routine named "$S_1$" described hereinbelow in response to a change of the switch $S_1$ from off to on or from on to off. A one shot pulse generating circuit 14 is connected to the photometry switch $S_1$ and generates a single pulse in response to a change of the photometry switch $S_1$ from on to off or from off to on. A release switch $S_2$ is turned on in response to depression of the shutter release button to a second stroke which is greater than the first stroke, and exposure operation is initiated by the turning on of the switch $S_2$. Further, a one frame switch $S_3$ is turned on upon completion of winding up of a film by one frame distance, and an opening monitor switch $S_4$ composed of a photocoupler is turned on just before a shutter is actuated in an opening direction to start exposure. The output of the photocoupler normally presents a voltage of a high level (hereinafter referred to as "H" level), but when the shutter comes to its initial position, an electric current flows through a light receiving portion thereof so that it will output a voltage of a low level (hereinafter referred to as "L" level). In particular, the switch $S_4$ is provided to compensate for deviations of the initial position of the shutter. Accordingly, where a shutter which presents no fluctuations in its initial position is employed, the switch $S_4$ is not necessitated. A switch $S_5$ is turned on when the shutter is returned to its initial position after it has been closed.

The circuit of FIG. 1 further includes a pair of mode switches $S_6$ and $S_7$ for setting an exposure mode therethrough. The camera of the present embodiment has three exposure modes including an aperture priority mode, a shutter speed priority mode and a normal mode, and one of the three modes is selectively determined by a combination of on and off states of the switches $S_6$ and $S_7$.

Now, a shutter actuating mechanism for shutter served also as an aperture in the present embodiment and a method of actuating the shutter as well as a mechanism for and a method of actuating the lens will be described briefly. The shutter and lens in the present embodiment are actuated indirectly by piezo-electric actuating elements provided individually therefor.

At first, a mechanism for actuating a shutter will be described with reference to FIG. 2. The mechanism shown includes a pair of shutter leaves or blades 15, 16 each having a small hole 15a, 16a and a slot 15c, 16c formed therein, respectively, and supported for pivotal motion on a common shaft 17. A pin 18 is implanted on an arm 15b extending from the shutter leaf or blade 15. An opening and closing lever 19 having two arms 19a and 19b is supported on a shaft 20. A pin 19c is implanted at an end portion of the arm 19a of the lever 19 and engaged in slots 15c, 16c formed in the shutter blades 15, 16. A piezo-electric actuating element $Bi_1$ is connected at a free end thereof to the arm 19b of the lever 19 by means of a pin 21. Here, the distance from the shaft 20 to the pin 19c is about 5 times of the distance from the shaft 20 to the pin 21. Accordingly, a motion of the piezo-electric actuating element $Bi_1$ is transmitted in an amplified magnitude to the shutter blades 15, 16.

Figure 2:
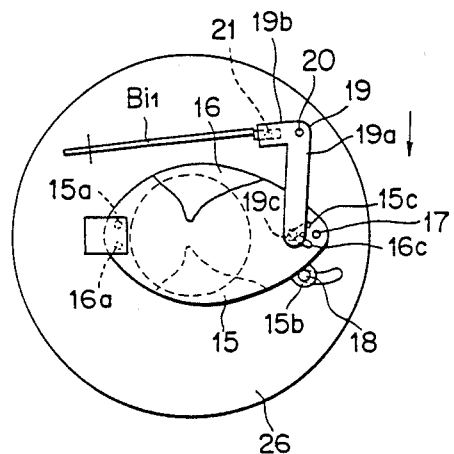
FIG. 2 is a front elevational view showing an exposure controlling mechanism of the camera of FIG. 1.
Figure 3A:
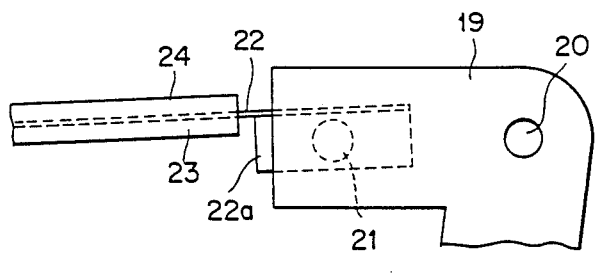
FIGS. 3a and 3b are a front elevational view and a top plan view, respectively, showing, in an enlarged scale, part of the exposure controlling mechanism of FIG. 2.
Figure 3B:
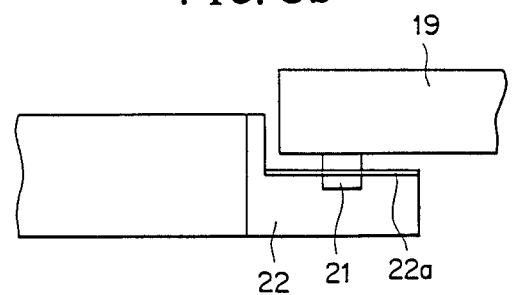

The piezo-electric actuating element $Bi_1$ is supported in the form of a cantilever with a left end portion thereof fixed in FIG. 2 and is connected at the free right end thereof to the lever 19 as seen in the enlarged views of FIGS. 3a and 3b. Referring to FIGS. 3a and 3b, the piezo-electric actuating element $Bi_1$ includes a metal substrate 22 and a pair of piezo-electric elements 23, 24 located on opposite faces of the metal substrate 22. An end of the substrate 22 is extended so as to form a bent lug 22a in which the pin 21 is engaged.

With the construction described above, if electrodes of the piezo-electric actuating element $Bi_1$ are shorted, it will pivot the shutter blades 15, 16 to their respective closed positions via the opening and closing lever 19 as seen in FIG. 2. To the contracry, if a voltage is applied between the electrodes, the piezo-electric actuating element $Bi_1$ will be deformed to pivot the opening and closing lever 19 to open the shutter blades 15, 16.

Figure 4A:
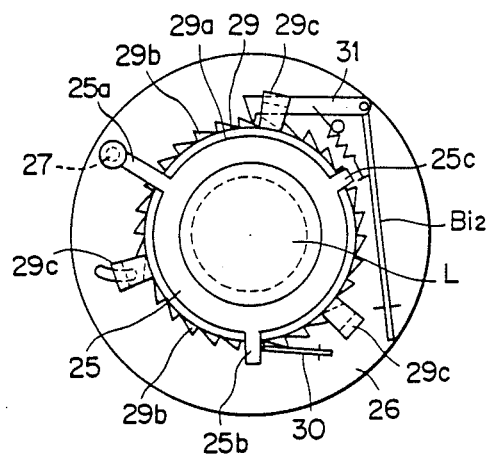
FIGS. 4a and 4b are front and side elevational views, respectively, showing a lens actuating mechanism of the camera of FIG. 1.
Figure 4B:
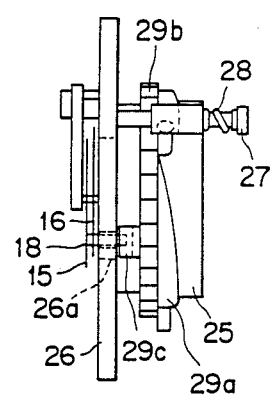

A lens actuating mechanism employed in the camera of the embodiment is shown in FIGS. 4a and 4b. The lens actuating mechanism shown includes a photographing lens L which is held integrally on a holding frame 25. The holding frame 25 has a support arm 25a fitted on a guide bar 27 implanted on a base plate 26. The holding frame 25 further has a pair of arms 25b, 25c individually formed in a spaced relationship by an angle of 120 degrees from the support arm 25a thereon. Thus, the holding frame 25 is supported for movement in a direction of an optical axis of the lens by means of the guide bar 27 and is urged in a leftward direction in FIG. 4b, that is, in a retracting direction, by a spring 28 to resiliently engage the arms 25a, 25b, 25c of the holding frame 25 with three cam sections 29a of a focusing cam ring 29.

The cam sections 29a of the focusing cam ring 29 have shape and are located in a spaced relationship by an angle of 120 degrees from each other. The focusing cam ring 29 further has ratchet teeth 29b formed over an entire periphery thereof, and three projections 29c located in a spaced relationship by an angle of 120 degrees from each other. The focusing cam ring 29 is supported for rotation around the optical axis but is allowed to rotate only in a clockwise direction in FIG. 4a while rotation thereof in the opposite counterclockwise direction is prevented by a spring plate 30 which engages with a ratchet tooth 29b of the cam ring 29.

A feed pawl lever 31 has a feed pawl for engagement with a ratchet tooth 29b of the cam ring 29 and is pivotally connected to an end of another piezo-electric actuating element $Bi_2$ and urged in a counterclockwise direction in FIG. 4a to resiliently engage the feed pawl thereof with a ratchet tooth 29b of the cam ring 29. The piezo-electric actuating element $Bi_2$ is supported in the form of a cantilever with a lower end portion thereof fixed in FIG. 4a, and the opposite free end portion thereof is connected to the feed pawl lever 31 as described hereinabove.

In an initial condition shown in FIG. 4a, the arms 25a, 25b and 25c of the holding frame 25 contact with lower portions of the cam sections 29a of the cam ring 29, and accordingly the photographing lens L is in a retracted position together with the holding frame 29. Meanwhile, one of the projections 29c of the cam ring 29 engages with the pin 18 extending through and from an elongated hole 26a in the base plate 26 to hold the shutter blades 15, 16 to the respective closed positions.

With the construction described above, if a voltage is applied between electrodes of the piezo-electric actuating element $Bi_2$ and then the electrodes are shorted, the piezo-electric actuating element $Bi_2$ will be first bent in a counterclockwise direction in FIG. 4a with respect to the lower fixed end thereof and then will return substantially to its initial shape. Upon this single vibration, the feed pawl 31a of the feed pawl lever 31 is first moved in a leftward direction in FIG. 4a over a ratchet tooth 29b and then draws the ratchet tooth 29b in the opposite rightward direction in FIG. 4a to rotate the cam ring 29 one tooth space in the clockwise direction. As such vibration is repeated, the ratchet teeth 29b are fed one after another in the clockwise direction so that the photographing lens L is advanced a distance corresponding to the number of the ratchet teeth 29b thus fed together with the lens holding frame 25. It is to be noted that each of the cam sections 29a is formed in such a manner as to increase the height while gradually moderating the slope from the bottom thereof. Accordingly, even though the urging force of the spring 28 increases as the lens holding frame 25 advances, a force required to feed the cam ring 29 one tooth space does not increase very much.

It is to be noted here that a lever for amplifying the vibration of the piezo-electric actuating element $Bi_2$ similar to the lever 19 shown in FIG. 2 may additionally be provided between the piezo-electric actuating element $Bi_2$ and the feed pawl 31a.

Figure 5:
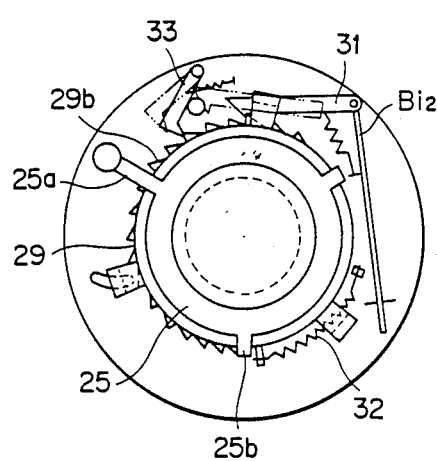
FIG. 5 is a front elevational view showing another lens actuating mechanism in a modified form.

FIG. 5 shows a modified form of the lens actuating mechanism shown in FIG. 4a. The modified lens actuating mechanism includes a spring 32 for urging the cam ring 29 to its initial position, and a stopping lever 33 urged to a position in which it engages with a ratchet tooth 29b of the cam ring 29 to prevent the cam ring 29 from returning to its initial position.

The piezo-electric actuating element $Bi_2$ is controlled to make small vibration of a small magnitude and large vibration of a large magnitude in a counterclockwise direction in FIG. 5. If a small vibration occurs, then the feed pawl lever 31 will feed the ratchet teeth 29b one tooth distance. To the contrary, if a large vibration occurs, then the stopping lever 33 will be pushed against the urging thereof by an end of the feed pawl lever 31 and thus moved to a position in which it is clear of the ratchet teeth 29b. Consequently, the cam ring 29 is returned to its initial position by the urging force of the spring 32.

Figure 6:
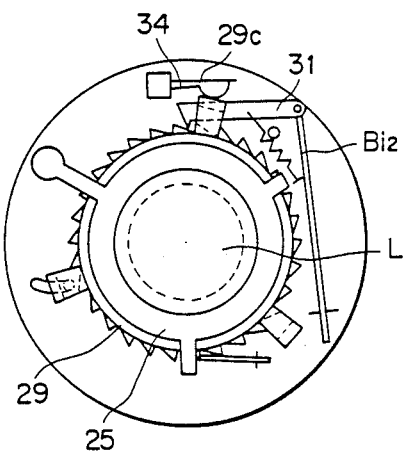
FIG. 6 is a similar view but showing a further lens actuating mechanism in another modified form.

Referring now to FIG. 6, another modified lens actuating mechanism is shown. The modified lens actuating mechanism shown includes a switch 34 for detecting that the cam ring 29 is rotated to its initial position.

Figure 7A:
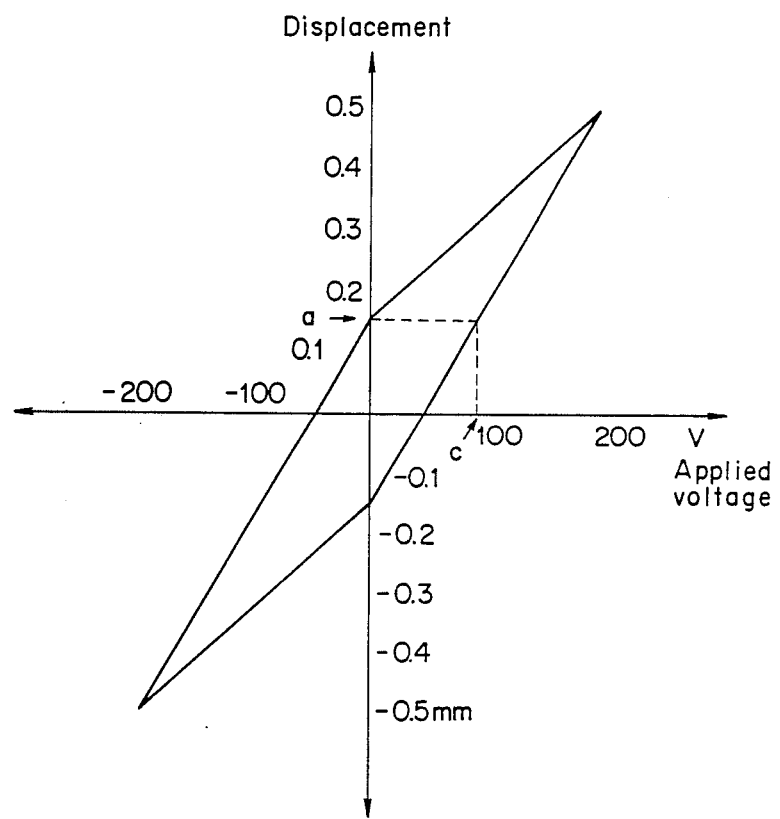
FIG. 7a is a graph illustrating a characteristic of a piezo-electric actuating element and FIG. 7b is an enlarged schematic view showing construction of such a piezo-electric actuating element.

Here, the piezo-electric actuating elements $Bi_1$, $Bi_2$ both have a voltage - displacement characteristic as shown in FIG. 7a, and if a voltage is applied across the piezo-electric actuating element with one end thereof fixed, the other end thereof will be displaced. Now, if a positive voltage is applied to one piezo-electric element A shown in FIG. 7b relative to the other piezo-electric element B, the piezo-electric actuating element $Bi_1$ will be bent in a direction indicated by an arrow mark in FIG. 2. This motion will move the opening and closing lever 19 located contiguously to the opposite end remote from the fixed end of the piezo-electric actuating element $Bi_1$ to open the shutter. The degree of exposure is determined by the amount of this motion.

As a method of controlling the amount of the displacement or motion of the piezo-electric actuating element, following two methods may be expected: (a) to control an applied voltage to control the amount of the displacement; and (b) to monitor the amount of the displacement and stop application of a voltage if a predetermined amount of displacement is reached. However, in the case of the method (b), the cost becomes high because means for monitoring the amount of displacement (for example, an encoder) is required. Therefore, the method (a) is employed in the present embodiment. In the present embodiment, as the method (a), a voltage is controlled by accumulating charge in a capacitor component of the piezo-electric actuating element itself and by monitoring a time required for such accumulation.

Figure 8:
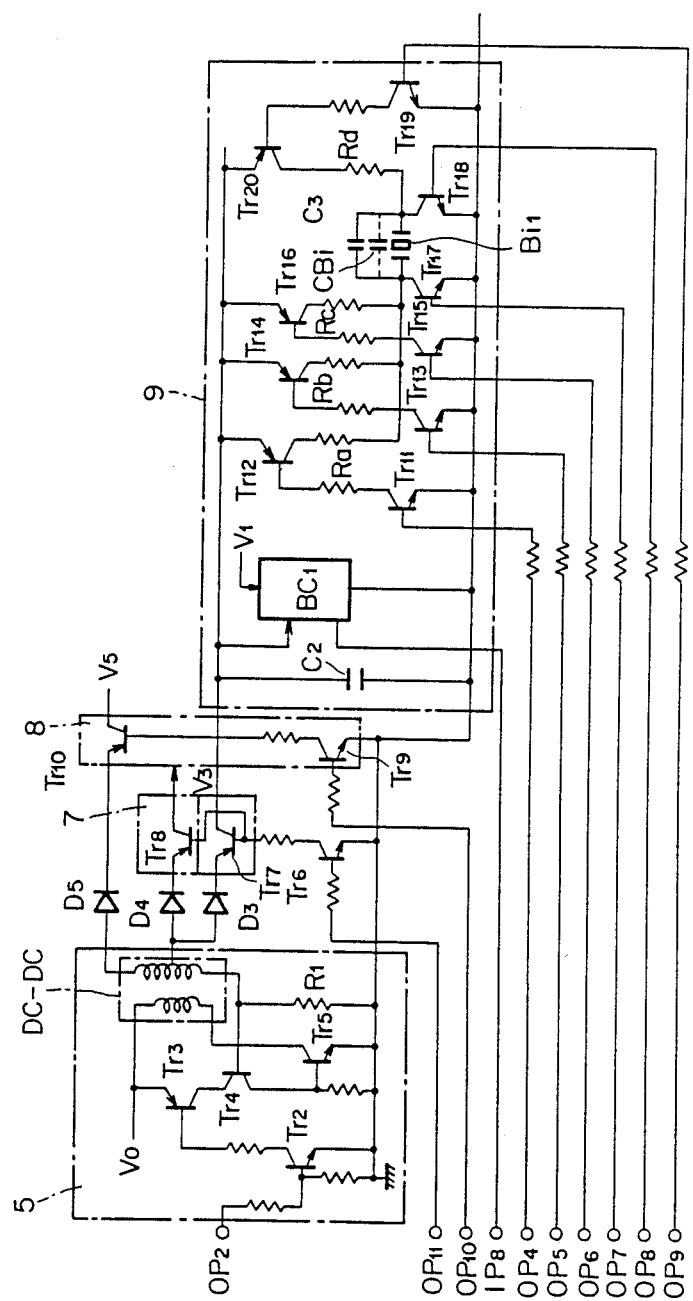
FIG. 8 is a circuit diagram showing detailed construction of an exposure controlling circuit and a switching circuit of the circuit of FIG. 1.

Referring now to FIG. 8, part of the circuit of FIG. 1 including a circuit for controlling the shutter is shown in more detail. The circuit shown includes the boosting circuit 5, the switching circuits 6, 7, 8 including transistors $Tr_6$ to $Tr_{10}$, and the exposure controlling circuit 9.

The boosting circuit 5 includes transistors $Tr_2$ to $Tr_5$, a resistor $R_1$ and a DC-DC converter DC-DC. Two different boosted voltages are taken out from a secondary winding of the DC-DC converter DC-DC. Of the two boosted voltages a voltage $V_5$ which is taken out via a diode $D_5$ and the transistor $Tr_{10}$ is supplied to the flash circuit 11 shown in FIG. 10 while the other voltage $V_3$ which is taken out via another diode $D_3$ and the transistor $Tr_7$ (here, $V_3 < V_5$) is supplied to the exposure controlling circuit 9. Further, the other voltage $V_4$ which is taken out via a further diode $D_4$ and the transistor $Tr_8$ (here, $V_4 = V_3$) is supplied to the lens actuating circuit 10 shown in FIG. 9.

Of the circuits, the exposure controlling circuit 9 in FIG. 8 includes a capacitor $C_2$ for accumulating charge therein, a voltage detecting circuit $BC_1$ for detecting a voltage accumulated in the capacitor $C_2$, a piezo-electric actuating element $Bi_1$, another capacitor $C_3$ connected in parallel to the piezo-electric actuating element $Bi_1$, and transistors $Tr_{11}$ to $Tr_{20}$.

The voltage detecting circuit $BC_1$ produces, when a voltage of 200 volts is detected, a detection signal of an "H" level to an input terminal $IP_8$ of the microcomputer 1. When such a detection signal is received, the microcomputer 1 turns off the transistors $Tr_6$, $Tr_7$, $Tr_8$ of the switching circuits 6, 7, 8, and further turns off the boosting controlling transistor $Tr_2$ of the boosting circuit 5 to stop boosting of the boosting circuit 5.

Figure 11:
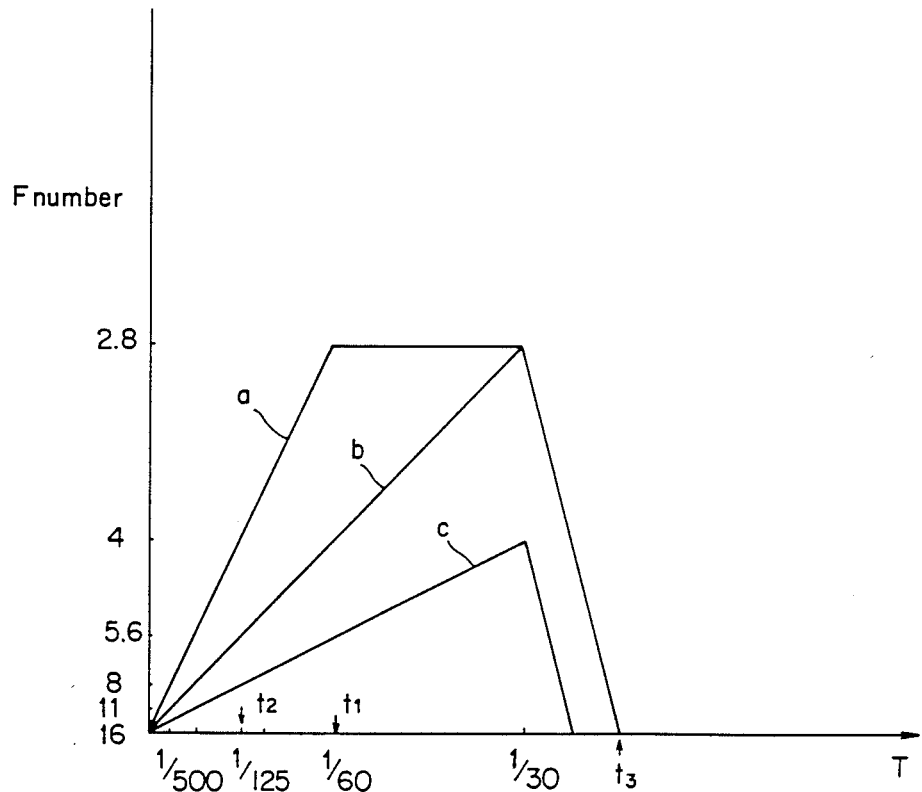
FIG. 11 is a program chart illustrating typical exposure programs employed in the camera of FIG. 1.

Now, the controlling transistors $Tr_{11}$ to $Tr_{20}$ which apply the voltage obtained in this manner across the piezo-electric actuating element $Bi_1$ will be described. The shutter of the present embodiment is designed to have combinations of three different shutter speeds (T) and three different aperture values (f-number) with respect to a change in brightness of an object as shown in FIG. 11. In order to realize such combinations, the current flow through the piezo-electric actuating element $Bi_1$ is controlled to control charging of the capacitor component of the piezo-electric actuating element $Bi_1$ to determine a slope of an exposure program line shown in FIG. 11 (a combination of an aperture value and a shutter speed). The amount of exposure is controlled by controlling the shutter speed (exposure time).

Here, the current flow through the piezo-electric actuating element $Bi_1$ is controlled by a combination of the transistors $Tr_{11}$, $Tr_{12}$ and a resistor Ra, another combination of the transistors $Tr_{13}$, $Tr_{14}$ and a resistor Rb, and a further combination of the transistors $Tr_{15}$, $Tr_{16}$ and a resistor Rc. Then, if $Ra < Rb < Rc$ where Ra, Rb, Rc represent resistances of the resistors Ra, Rb, Rc, respectively, then when the transistors $Tr_{11}$ and $Tr_{12}$ are turned on, the amount of exposure is controlled in accordance with the program line (a) shown in FIG. 11, and when the transistors $Tr_{13}$ and $Tr_{14}$ are turned on, the amount of exposure is controlled in accordance with the program line (b) shown in FIG. 11, but when the transistors $Tr_{15}$ and $Tr_{16}$ are turned on, the amount of exposure is controlled in accordance with the program line (c) shown in FIG. 11. This will be hereinafter described.

Figure 7B:
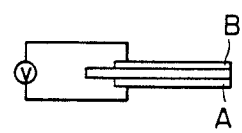

The side of the piezo-electric actuating element $Bi_1$ connected to the collector of the transistor $Tr_{18}$ corresponds to the piezo-electric element B of FIG. 7b. Now, if the transistors $Tr_{11}$, $Tr_{12}$ and the transistor $Tr_{18}$ are turned on, the piezo-electric element B shown in FIG. 7a is grounded while a voltage of 200 volts is applied to the piezo-electric element A via the resistor Ra and the transistor $Tr_{12}$. Consequently, charge is accumulated in the capacitor component $CBi$ of the piezo-electric actuating element $Bi_1$ and the capacitor $C_3$ connected in parallel to the piezo-electric actuating element $Bi_1$ to raise the charged voltage of them. Accordingly, the piezo-electric actuating element $Bi_1$ is bent as time passes, and in this case the opening of the shutter presents a waveform as shown by the program line (a) in FIG. 11. Here, the capacitor $C_3$ is provided to control the magnitude of displacement of the piezo-electric actuating element $Bi_1$ relative to the time which displacement appears because the capacitance of the capacitor component $CB_1$ of the piezo-electric actuating element $Bi_1$ is small.

Then, as a time $t_1$ shown in FIG. 11 is reached, the applied voltage across the piezo-electric actuating element $Bi_1$ reaches 200 volts, and thereafter the piezo-electric actuating element $Bi_1$ is left in this condition. Here, if a predetermined amount of exposure is reached before the applied voltage across the piezo-electric actuating element $Bi_1$ reaches 200 volts, for example, at a time $t_2$, the transistors $Tr_{11}$, $Tr_{12}$ are both turned off and then the transistor $Tr_{17}$ is turned on to short opposite ends of the piezo-electric actuating element $Bi_1$ to close the shutter. Consequently, the shutter is closed to terminate the exposure operation. However, the shutter will not return to its initial position due to a hysteresis characteristic of the piezo-electric actuating element $Bi_1$.

Therefore, in order to return the shutter to its initial position, a reverse voltage is applied across the piezo-electric actuating element $Bi_1$. To this end, the transistor $Tr_{18}$ is turned off and the transistors $Tr_{19}$, $Tr_{20}$ are turned on to raise the voltage to the piezo-electric element B higher than the voltage to the piezo-electric element A. However, if such a voltage is applied suddenly across the piezo-electric actuating the piezo-electric actuating element $Bi_1$ will be bent excessively in the reverse direction. Therefore, a resistor Rd is interposed between the collector of the transistor $Tr_{20}$ and the piezo-electric element B of the piezo-electric actuating element $Bi_1$ In this manner, a gradually increasing voltage is applied across the piezo-electric actuating element $Bi_1$ to bend the latter. Then, when the shutter is returned to its intial position (this is detected by turning on of the switch $S_5$ located at the initial position), the transistors $Tr_{19}$, $Tr_{20}$, $Tr_{17}$ are all turned off to stop application of a higher voltage. This operation is performed for each photographing.

Now, the diagram showing relationships of the aperture value and shutter speed to the brightness shown in FIG. 11 will be described. Referring to FIG. 11, the program line (a) illustrates a relationship of a shutter speed priority type, the program line (b) illustrates that of a normal type, and the program line (c) illustrates that of an aperture priority type. In accordance with one of the types selected by operation of the mode switches, a combination of an aperture value and a shutter speed as shown in FIG. 11 is obtained with respect to a brightness. For example, if the brightness Bv of an object is Bv=6 and the film sensitivity Sv is Sv=5 (ISO=100), then Av=4 (F number=4) and Tv=7 (shutter speed=125) are obtained on the program line (a) of the shutter speed priority type, but Av=4.5 (F number=4.8) and Tv=6.5 (shutter speed=1/90) are obtained on the program line (b) of the normal type, and Av=5 (F number=5.6) and Tv=6 (shutter speed=1/60) are obtained on the program line (c) of the aperture priority type. The exposure value Ev determined by the measured brightness value Bv and the film sensitivity value Sv which correspond to the limit shutter speed for preventing a camera shake is Ev=7.5 on the program line (a) of the shutter speed priority type, Ev=8.0 on the program line (b) of the normal type, and Ev=9.0 on the program line (c) of the aperture priority type. If the exposure value decreases further, the shutter is closed at this timing while the flash light emission is started when the aperture diameter of shutter reaches a suitable aperture value determined by known flashmatic principle in accordance with a distance to an object. Here, Ev representing the exposure value is defined by Ev=Bv+Sv=Av+Tv.

Figure 9:
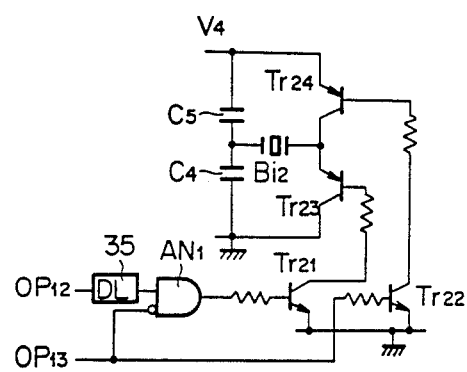
FIG. 9 is a circuit diagram showing detailed construction of a lens actuating circuit of the circuit of FIG. 1.

Now, the photographing lens actuating circuit 10 shown in FIG. 9 will be described. In the present embodiment, a circular motion of the ratchet of the endless type is converted into a linear motion to actuate the photographing lens as described hereinabove. Thus, a number of pulses required to move the lens to a position specified by information regarding a distance from the camera to an object are delivered to the lens actuating circuit 10 by the microcomputer 1 in order to control the distance of movement of the photographing lens in accordance with the number of such pulses. At first, after completion of an exposure operation, a number of pulses N-Ni which is obtained by subtracting a number N1 of pulses required to move the lens for focusing from a number N of pulses required to reciprocate the lens from an infinite focusing position to a nearest focusing position are delivered to the lens actuating circuit 10 by the microcomputer 1 to return the lens to its initial position. Such control is achieved by the lens actuating circuit shown in FIG. 9. In the lens actuating circuit 10, a voltage Va corresponding to an amount of displacement of the feed pawl lever required to feed the ratchet by the number of steps required for focusing the lens is accumulated in a capacitor $C_5$ while a voltage Vb required for returning the lens to its initial position is accumulated in another capacitor $C_4$. Then, a transistor $Tr_{24}$ is turned on to allow the voltage Va accumulated in the capacitor $C_5$ to be applied across the piezo-electric actuating element $Bi_2$ to displace the piezo-electric actuating element $Bi_2$ for actuation of the lens for focusing. Then, the transistor $Tr_{24}$ is once turned off and another transistor $Tr_{23}$ is turned on to allow the voltage Vb accumulated in the capacitor $C_4$ to be applied in the opposite direction across the piezo-electric actuating element $Bi_2$ to return the piezo-electric actuating element $Bi_2$ to its initial position. This sequence is repeated for the number N-N1 of pulses delivered from the microcomputer 1. In this instance, the transistor $Tr_{24}$ is turned on by turning on of a transistor $Tr_{22}$ which is turned on when an output terminal $OP_{13}$ of the microcomputer 1 provides an "H" level. Meanwhile, the transistor $Tr_{23}$ is turned on by turning on of a transistor $Tr_{21}$ which is turned on when the output terminal $OP_{13}$ provides an "L" level. A delay circuit 35 is connected to an output terminal $OP_{12}$ of the microcomputer 1. Just before the microcomputer 1 produces a pulse of the "H" level from the output terminal $OP_{13}$ thereof, the output of the output terminal $OP_{13}$ presents an "L" level, and an inverted signal of this and a signal of the "H" level from the output terminal $OP_{12}$ are applied to an AND circuit $AN_1$ which thus produces a signal of the "H" level to turn the transistors $Tr_{21}$, $Tr_{23}$ on to apply a reverse voltage across the piezo-electric actuating element $Bi_2$ thereby to prevent the piezo-electric actuating element $Bi_2$ from displacing in a direction opposite to a direction in which it should be actuated. Accordingly, a negative voltage will not be applied across the piezo-electric actuating element $Bi_2$ before a positive voltage is applied thereacross. It is to be noted here that the output terminal $OP_{12}$ of the microcomputer 1 provides a signal of the "H" level directly before a pulse is produced from the output terminal $OP_{13}$.

Figure 10:
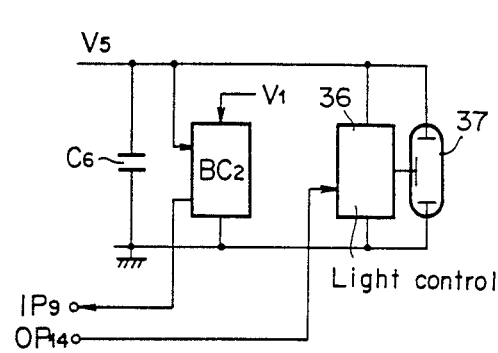
FIG. 10 is a circuit diagram showing construction of a flash circuit of the embodiment shown in FIG. 1.

Now, the flash circuit 11 shown in FIG. 10 will be described. The flash circuit 11 shown in FIG. 10 includes a capacitor $C_6$ for accumulating energy for emission of light therein, and a voltage detecting circuit $BC_2$ for monitoring a charged voltage of the capacitor $C_6$. The voltage detecting circuit $BC_2$ produces a charging completion signal when the voltage of the capacitor $C_6$ reaches a desired level. Such a charging completion signal is received by an input terminal $IP_9$ of the microcomputer 1 to stop a boosting operation by the boosting circuit 5. The flash circuit 11 further includes a light emission controlling circuit 36 which operates in response to a light emitting signal from the output terminal $OP_{14}$ of the microcomputer 1 to cause the charged energy of the capacitor $C_6$ to discharge via a xenon tube 37 thereby to cause the xenon tube 37 to emit light.

A sequencing operation of the camera from the circuits described above will now be described with reference to a flow chart of the microcomputer 1 illustrated in FIGS. 12a, 12b and 12c in which a piezo-electric actuating element is represented by the abbreviation P.E.E..

At first, if a lens cover or cap not shown is opened, the switch $S_0$ turns on so that a signal changing from the "H" level to the "L" level is delivered to an interrupt terminal $INT_1$ of the microcomputer 1 to interrupt the microcomputer 1. Consequently, a flow of an interrupt routine "$S_0ON$" shown in FIG. 12 is executed. The microcomputer 1 resets, at first at step #1 (the word "step" is hereinafter omitted), various flags and output terminals thereof to the "L" level, and then at #2, changes the output terminal $OP_0$ to the "H" level to turn the power supply transistor $Tr_1$ on to supply the power to the various circuits. Then at #3, a signal at the input terminal $IP_1$ is detected to judge whether or not the photometry switch $S_1$ is on. If the switch $S_1$ is on, then the program advances to #22, but on the contrary if the switch $S_1$ is off, an "$S_1OFF$" routine beginning with #4 is executed.

In the "$S_1OFF$" routine, at first at #4, the output terminal $OP_2$ is changed into the "L" level to once stop a boosting operation of the boosting circuit 5, and then at #5, the output terminal $OP_{10}$ is changed into the "L" level to turn the switching circuit 8 off to stop a boosting operation also of the flash circuit 11. After then, at #6, the output terminal $OP_{11}$ is changed into the "H" level to turn the switching circuits 6, 7 on in order to charge up the capacitors $C_2$, $C_4$, $C_5$ for driving the piezo-electric actuating element $Bi_1$, and then at #7, the output terminal $OP_2$ is changed into the "H" level to turn the transistor $Tr_2$ on to start boosting by the boosting circuit 5.

Then, since a charging completion signal is delivered from the voltage detecting circuit $BC_1$ to the input terminal $IP_8$ if a charged voltage of the capacitor $C_2$ for driving the exposure controlling piezo-electric actuating element $Bi_1$ reaches a desired level, the microcomputer 1 waits, at #8, reception of such a charging completion signal. Upon reception of such a signal, the microcomputer 1 changes, at #9, the output terminal $OP_{11}$ thereof into the "L" level to turn both of the switching circuits 6, 7 off. In this instance, the charged voltages of the capacitors $C_4$, $C_5$ are equal to the charged voltage of the capacitor $C_2$ since their circuit constructions are identical. Subsequently, at #10, the microcomputer 1 changes the output terminal $OP_6$ into the "L" level to once stop a boosting operation for the capacitor $C_3$, and then at #11, changes the output terminal $OP_{10}$ into the "H" level to turn the transistor $Tr_{10}$ of the switching circuit 8 on to start boosting for the capacitor $C_6$ of the flash circuit 11. Then, at #12, the output terminal $OP_6$ is changed into the "H" level again to start boosting for the piezo-electric actuating element driving capacitor $C_3$ of the exposure controlling circuit 9.

Then, at #13, the microcomputer 1 waits for a charging completion signal to be received from the voltage detecting circuit $BC_2$ of the flash circuit 11, and then upon reception of such a charging completion signal at the input terminal $IP_9$ of the microcomputer 1, it changes, at #14, the output terminal $OP_6$ into the "L" level to stop the boosting for the piezo-electric actuating element driving capacitor $C_3$. Subsequently, at #15, the output terminal $OP_{10}$ is changed into the "L" level to turn the transistor $Tr_9$ off to stop the boosting for the capacitor $C_6$ of the flash circuit 11, and then at #16, the output terminal $OP_0$ is changed into the "L" level to turn the power supply transistor $Tr_1$ off to stop operation.

If the photometry switch $S_1$ is turned on from off or turned off from on, a pulse is produced from the one shot pulse generating circuit 14 and is received at another interrupt terminal $INT_2$ of the microcomputer 1. Upon reception of such an interrupt signal, the microcmputer 1 executes a flow of an interrupt routine "$S_1$".

In the interrupt routine "$S_1$", at first at #17, the microcomputer 1 judges from an input signal at the input terminal $IP_1$ thereof whether the photometry switch $S_1$ is on, and if the switch $S_1$ is off, then the program advances to #4 again. To the contrary, if the switch $S_1$ is on, then the output terminal $OP_6$ is changed, at #18, into the "L" level to stop the boosting of the piezo-electric actuating element driving capacitor $C_3$, and then at #19 and #20, the output terminals $OP_{10}$, $OP_{11}$ are both changed into the "L" level to turn all of the switching circuits off. Then, at #21, various flags and output terminals are reset, and at #22, the output terminal $OP_{11}$ is changed into the "H" level to turn the transistors $Tr_6$, $Tr_7$ of the piezo-electric actuating element switching circuits on to start boosting of the piezo-electric actuating element driving capacitor $C_3$ whereafter a built-in timer is reset and re-started at #23. The timer is provided for measuring a time necessary to charge up the capacitors $C_2$, $C_4$, $C_5$ for the piezo-electric actuating elements $Bi_1$, $Bi_2$. Thus, a degree of exhaustion of the power source battery MB may be estimated from the time measured by the timer, and if a time greater than a predetermined time is required for charging up, warning will be given from the voltage detecting circuit $BC_1$ as the degree of exhaustion of the power source battery MB is excessive.

Subsequently, at #24, the output terminal $OP_2$ of the microcomputer 1 is changed into the "H" level to start a boosting operation of the boosting circuit 5, and then at #25 in FIG. 12b, the microcomputer 1 waits a charging completion signal to be received from the voltage detecting circuit $BC_1$. Upon reception of such a charging completion signal, the timer is stopped at #26, and then at #27 and #28, the output terminals $OP_2$, $OP_{11}$ are both changed into the "L" level to stop the boosting operation by the boosting circuit 5 and to turn the switching circuit off to stop charging of the piezo-electric actuating element driving capacitor $C_3$.

At #29, the microcomputer 1 judges whether or not a time T required for operation from #23 to #26 as measured by the built-in timer is equal to or greater than a predetermined time $T_1$. Then, if the time T thus measured is equal to or greater than the predetermined time $T_1$, it is judged that the degree of exhaustion of the battery is excessive and hence warning for checking of the battery is given at #30 whereafter the program advances to 31. On the contrary, if the measured time T is smaller than the predetermined time $T_1$, then the program advances to #31 while skipping #30.

At #31, the microcomputer 1 delivers a signal indicative of starting of a distance measuring operation from output terminals thereof to the distance measuring circuit 13 and delivers, at #32, a signal indicative of starting of a photometric operation to the photometry circuit 2, and then waits for a time necessary for the individual measurements. Further, the microcomputer 1 reads, at #34, a film sensitivity Sv from the film sensitivity reading circuit 3 and reads, at #35, a brightness value Bv from the photometry circuit 2, and then carries out, at #36, a calculation of Ev=Bv+Sv to find out an exposure value Ev. Subsequently, at #37, the microcomputer 1 reads a measured distance value from the distance measuring circuit 13, and at #38, a number N1 of pulses necessary for actuation of the ratchet is calculated from the measured distance value.

Subsequently, at #39, the microcomputer 1 determines an exposure mode which is selected by operation of the mode switches $S_6$, $S_7$, and in the case of the normal mode, a subroutine for the normal mode is executed at #41, but in the case of the aperture priority mode, a subroutine for the aperture priority mode is executed at #42 after execution of #40, or otherwise in the case of the shutter speed priority mode, a subroutine for the shutter speed priority mode is executed at #43 after execution of #40.

Figure 12A:
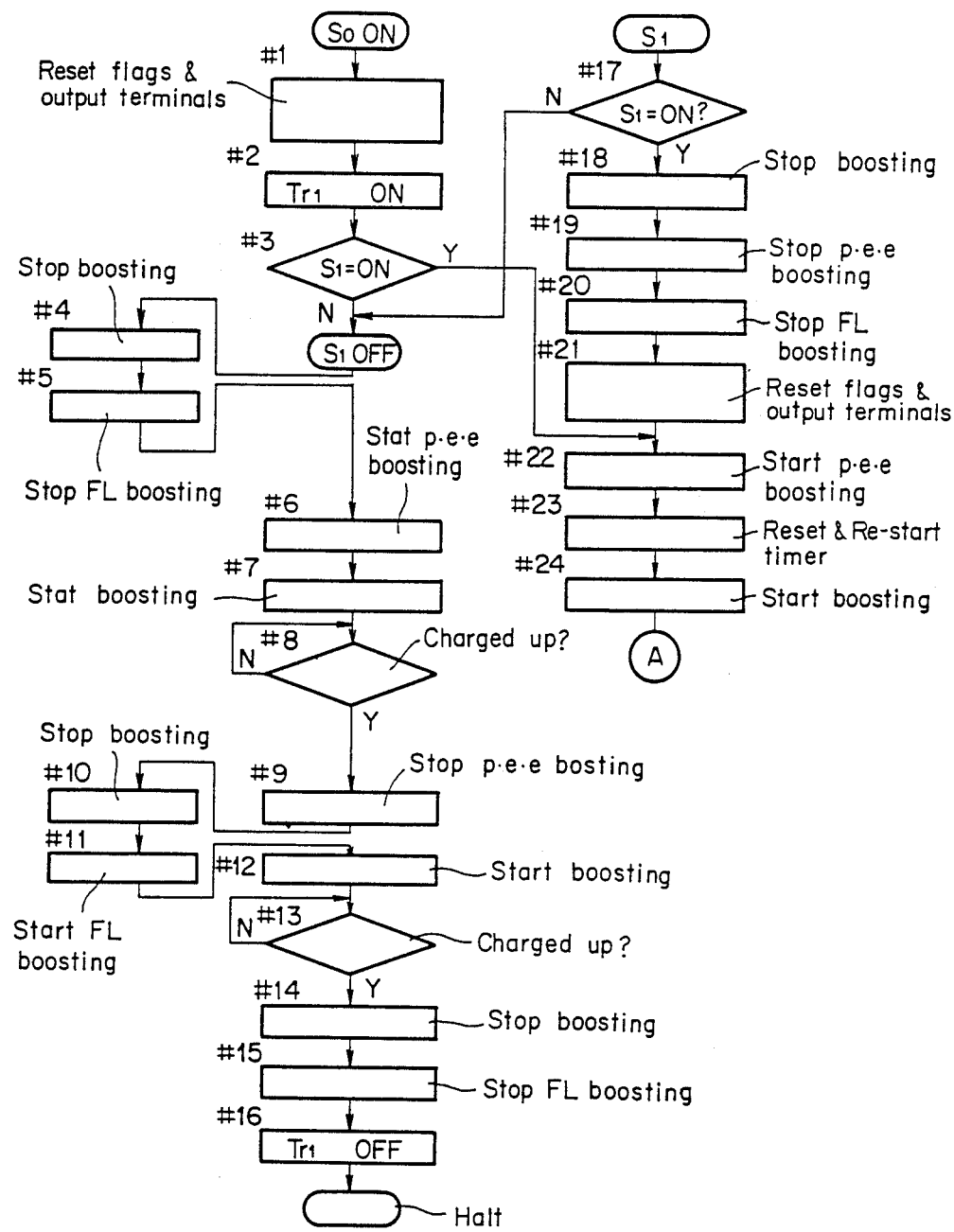
FIGS. 12a, 12b and 12c are flow charts of an interrupt routine illustrating a flow of operations of the camera of FIG. 1.
Figure 12B:
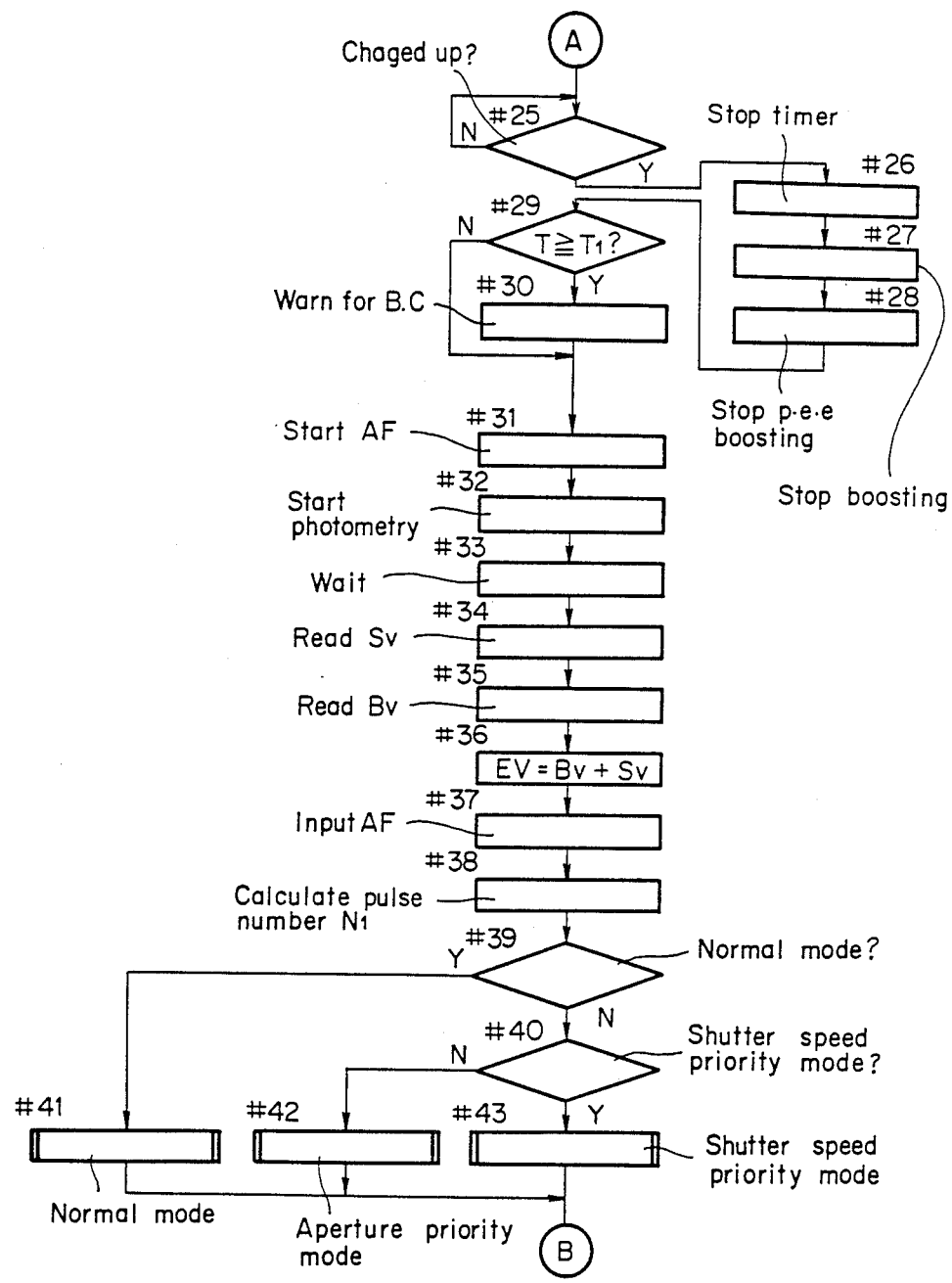
Figure 12C:
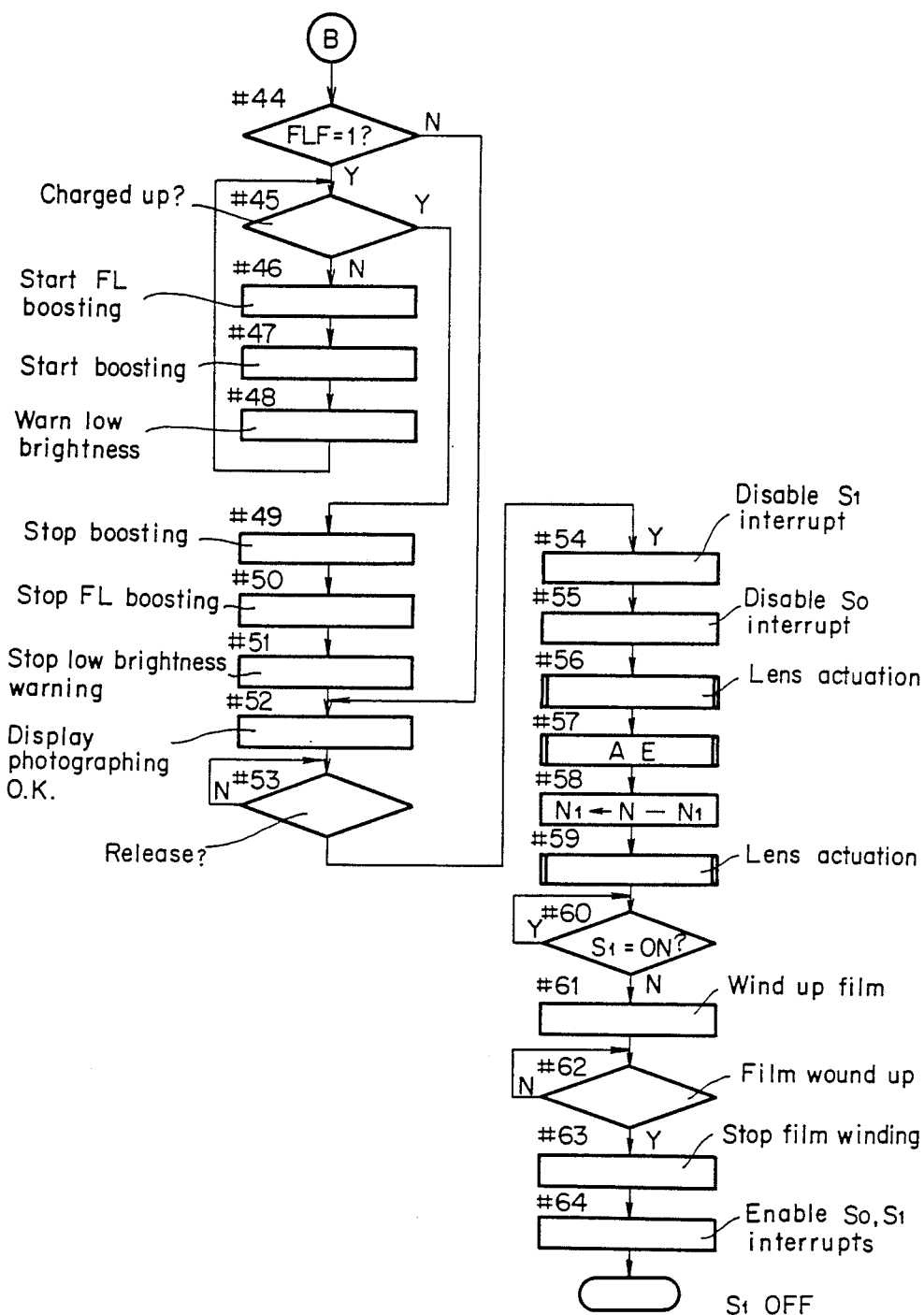
Figure 13A:
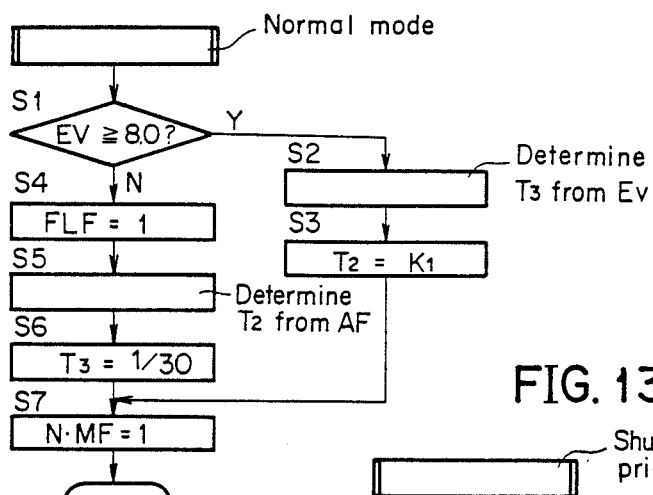
FIGS. 13a, 13b and 13c are flow charts of different subroutines each illustrating operation of the camera of FIG. 1 when one of different exposure programs is selected.
Figure 13B:
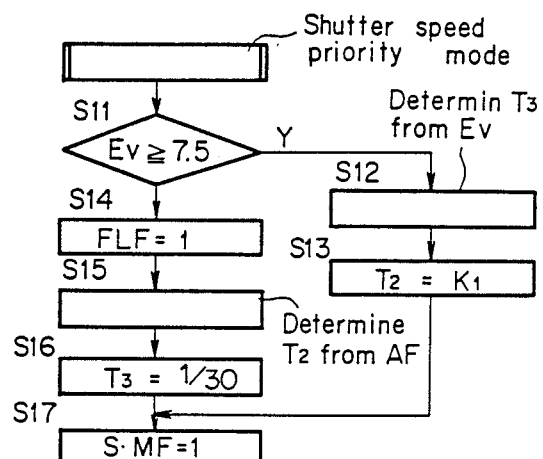
Figure 13C:
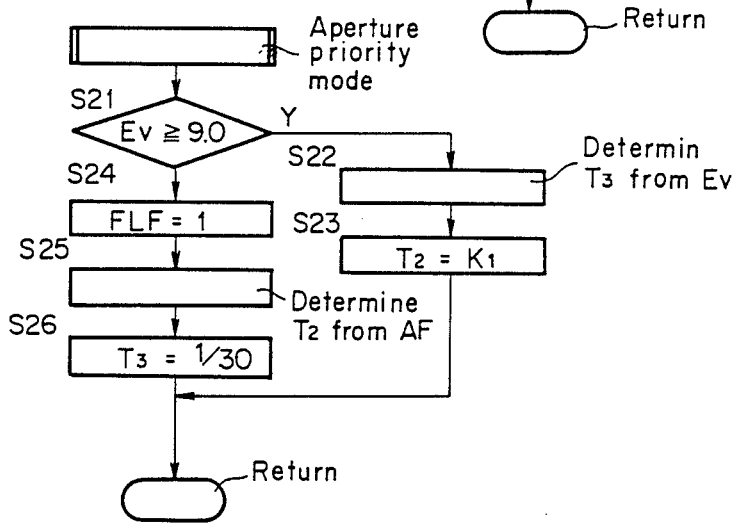

The three subroutines are illustrated in FIGS. 13a, 13b and 13c. At first, in the case of the normal mode, referring to a flow of FIG. 13a, it is judged at step S1 (the word "step" will be hereinafter omitted) whether the exposure value Ev is equal to or greater than 8.0, and where the exposure value Ev is equal to or greater than 8.0, an exposure time $T_3$ is determined, at $S_2$, from the exposure value Ev in accordance with the program line (b) of FIG. 11. Then at S3, a time $K_1$ which is longer than a time required to reach a time $T_3$ indicated in FIG. 11 is set as a time $T_2$ at which the xenon tube 37 of the flash circuit 11 is to be lit, and then at S7, a normal mode flag NMF indicative of the normal mode is set to "1", whereafter the routine of FIG. 12 is re-entered. On the contrary, where the exposure value Ev is smaller than 8.0 at S1, a flag FLF indicative of a flash photographing mode is set to "1" at S4, and then at S5, an aperture value required for flash photographing is determined from the measured distance value in accordance with the principle of the flashmatic (here, it is assumed that the amount of flash light to be emitted is constant). Then, a time $T_2$ corresponding to the aperture value is determined from the program line (b) of FIG. 11, and then at S6, the exposure time $T_3$ then is determined to be 1/30 second. Theretime after, the normal mode flag NMF is set to "1" at S7, and then the routine of FIG. 12 is re-entered.

Otherwise in the case of the shutter speed preferring mode, referring to FIG. 13b, it is judged at S11 whether or not the exposure value Ev is equal to or greater than 7.5. Where the exposure value Ev is equal to or greater than 7.5, an exposure time $T_3$ is determined, at S12, from the exposure value Ev in accordance with the program line (a) of FIG. 11. Then at S13, the time $T_2$ which defines a timing of emission of flash light is determined as $K_1$ in a similar manner as described above, and at S17, a shutter speed priority mode flag SMF indicative of the shutter speed priority mode is set to "1" whereafter the routine of FIG. 12 is re-entered. To the contrary, where the exposure value Ev is smaller than 7.5, the flag FLF indicative of the flash photographing mode is set to "1" at S14. Then at S15, a time $T_2$ is determined from the program line (a) of FIG. 11 in accordance with the measured distance value, and then at S16, the exposure time $T_3$ is determined to be 1/30 second, whereafter the flag SMF is set at S17 and then the routine of FIG. 12 is re-entered.

Further, in the case of the aperture priority mode, it is judged at S21 of FIG. 13c whether or not the exposure value Ev is equal to or greater than 9.0. If the exposure value Ev is equal to or greater than 9.0, then an exposure time $T_3$ is determined at S22 from the exposure value Ev in accordance with the program line (c) of FIG. 11. Then at S23, a time $T_2$ at which flash light is to be emitted is determined to be $K_1$, and then the routine of FIG. 12 is re-entered. To the contrary, if the exposure value Ev is smaller than 9.0 at S21, the flag FLF indicative of the flash photographing mode is set to "1", and at S25, a time $T_2$ is determined from the program line (c) of FIG. 11 in accordance with the measured distance value. Then at S26, the exposure time $T_3$ is determined to be 1/30 second, and the routine of FIG. 12 is re-entered. Here, a method of determining an exposure time $T_3$ from the calculated exposure value Ev and a method of determining a time $T_2$ at which flash light is to be emitted from the measured distance value may be such that times $T_3$, $T_2$ are read out in accordance with a calculated exposure value and a read measured distance value from respective tables (memories) which have been prepared in advance and employ exposure values Ev and measured distance values as a parameter, respectively.

After the exposure time $T_3$ and the time $T_2$ at which flash light is to be emitted have been determined in any subroutine at #41, #42 and #43 shown in FIG. 12b, the microcomputer 1 judges, at #44 shown in FIG. 12c, whether or not the flag FLF indicative of the flash photographing mode is set, and where the flag FLF is in the set state, the program advances to #45 at which the microcomputer 1 checks a charging completion signal from the voltage detecting circuit $BC_2$. If the charging up of the flash light emitting capacitor $C_6$ is not yet completed, the output terminal $OP_{10}$ is changed at #46 into the "H" level to turn the switching circuit 8 on to start boosting of the capacitor $C_6$. Then at #47, the output terminal $OP_2$ is changed into the "H" level to start a boosting operation of the boosting circuit 5, and then at #48, a signal for warning of a low brightness is produced, whereafter the program returns to #45 to wait completion of charging up of the capacitor $C_6$.

Upon completion of charging up of the flash light emitting capacitor $C_6$, the program advances to #49 and then to #50 at which the output terminals $OP_2$, $OP_{10}$ are changed into the "L" level to stop the boosting operation of the boosting circuit 5 and turn the switching circuit 8 off, respectively. Then at #51, delivery of the signal of warning of a low brightness is stopped, and then the program advances to #52. Also where the flag FLF indicative of the flash photographing mode is not in the set state at #44, the program advances to #52. Thus at #52, an indication that photographing is possible is given, and then at #53, the microcomputer 1 waits for the release switch $S_2$ to be turned on. Then, when the release switch $S_2$ is turned on, interruptions from the interrupt terminals $INT_1$, $INT_2$ by the switches $S_1$, $S_0$ are inhibited at #54 and #55, respectively, whereafter the subroutine of the "LENS ACTUATION" at #56 is executed.

The subroutine of the "LES ACTUATION" is shown in FIG. 14. Referring to FIG. 14, at first at #100, the output terminal $OP_{12}$ of the microcomputer 1 is changed into the "H" level, and then at #101, the number N1 of pulses are produced from the output terminal $OP_{13}$. After production of the number N1 of pulses, the output terminal $OP_{12}$ is changed into the "L" level at #102, and then the program returns to #57 of FIG. 12c.

Subsequently at #57 shown in FIG. 12c, the microcomputer 1 advances to a subroutine of "AE". A flow chart of the subroutine is illustrated in FIG. 15. Referring to FIG. 15, at first at #200, the output terminal $OP_8$ is changed into the "H" level so that 0 volts is applied to the piezo-electric element B of the exposure controlling piezo-electric actuating element $Bi_1$. Subsequently, an exposure mode is determined at #201 and #202, and in the case of the normal mode, the output terminal $OP_5$ is changed, at #203, into the "H" level, but in the case of the shutter speed priority mode, the output terminal $OP_4$ is changed into the "H" level at #204, or otherwise in the case of the aperture priority mode, the output terminal $OP_6$ is changed into the "H" level at #205, whereby one of the program lines (a), (b), (c) shown in FIG. 11 is determined in accordance with the exposure mode thus selected. Then at #206, the microcomputer 1 waits that the shutter starts to move open and the switch $S_4$ is turned on directly before starting of exposure. Then, when the switch $S_4$ is turned on, the internal timer is reset and re-started at #207.

Subsequently at #208 and #209, the microcomputer 1 waits lapse of the determined flash light emitting time $T_2$ and the calculated exposure time $T_3$. Here, since $T_2$ elapses earlier than $T_3$ where $T_2 < T_3$, the program advances from #208 to #210 at which flash light is emitted at a timing corresponding to $T_2$. Then at #211, the microcomputer 1 waits lapse of the time $T_3$, and when $T_3$ elapses, the program advances to #214 so that a shutter closing controlling sequence may be subsequently executed. To the contrary, where $T_2 \leq T_3$, $T_3$ elapses earlier than $T_2$. Accordingly, the program advances from #209 to #212 at which the microcomputer 1 judges whether or not the flag FLF indicative of the flash photographing mode is set. In case the flag FLF is in the set state at #212 and hence the camera is in the flash photographing mode, flash light is emitted at #213, and then the shutter closing controlling sequence including #214 is executed. On the contrary, in case the camera is not in the flash photographing mode, the shutter closing controlling sequence is subsequently executed without performing emission of flash light of #213.

At #214, the output terminals $OP_4$, $OP_5$, $OP_6$ of the microcomputer 1 are changed into the "L" level to remove application of a voltage across the exposure controlling piezo-electric actuating element $Bi_1$, and then at #215, the output terminal $OP_7$ is changed into the "H" level to short the piezo-electric actuating element $Bi_1$. Then at #216, the internal timer of the microcomputer 1 is stopped, and then the microcomputer 1 waits, at #217, the shutter to be closed.

Subsequently, at #218, the output terminal $OP_8$ of the microcomputer 1 is changed into the "L" level to turn the transistor $Tr_{18}$ off, and further at #219, the output terminal $OP_9$ is changed into the "H" level to apply a positive voltage across the piezo-electric element B relative to the other piezo-electric element A of the piezo-electric actuating element $Bi_1$. Consequently, a reverse voltage is applied across the piezo-electric actuating element $Bi_1$ so that the latter is displaced in the reverse direction. Consequently, the shutter is actuated further in the closing direction until its initial position is reached whereupon the switch $S_5$ indicating this position is turned on. The microcomputer 1 waits, at #220, the switch $S_5$ to be turned on, and when the switch $S_5$ is turned on, the output terminals $OP_7$, $OP_9$ are changed, at #221, into the "L" level to stop application of the voltage across the piezo-electric actuating element $Bi_1$, whereafter the program returns to #58 of FIG. 12c.

Referring back to FIG. 12c, the microcomputer 1 subtracts, at #58, the number N1 of pulses necessary for the actuation described above from the number N of pulses necessary for a reciprocating motion of the lens to update N1, and then at #59, the program advances again to the subroutine of "LENS ACTUATION" shown in FIG. 14. Then, after completion of the subroutine of "LENS ACTUATION" of #59, the microcomputer 1 judges at #60 whether the photometry switch $S_1$ is on, and where the photometry witch $S_1$ is not on, a signal to instruct starting the film to be wound up one frame distance is delivered, at #61, to the motor controlling circuit 4, and then at #62, the microcomputer 1 waits for the completion of the intended winding up of the film. Then when the switch $S_3$ which indicates completion of the winding up of the film by one frame distance is turned on, the microcomputer 1 produces, at #63, a signal instructing stopping of the motor to the motor controlling circuit 4. Then at #64, the microcomputer 1 enables interruption by the switches $S_0$, $S_1$, and the program advances to the routine of "$S_1$OFF" beginning with #4.

Here, in the embodiment described above, the lens is actuated to the predetermined in-focus position and returned to the initial position using ratchet actuation of the endless type. However, where the modified lens actuating mechanism as shown in FIG. 5 is employed instead of the lens actuating mechanism as shown in FIGS. 4a and 4b, naturally the circuit for controlling the mechanism and the flow chart of operation of the microcomputer therein must be modified. In particular, the mechanism shown in FIG. 5 is common to the mechanism shown in FIGS. 4a and 4b in that the lens is actuated to a predetermined position using ratchet actuation but is designed differently such that when the lens is to be returned, the stopping lever 33 for preventing reverse rotation may be pressed by the feed pawl lever 31 to remove stopping by the detent lever 33 in order to allow the lens to be returned by a force of the spring 32. When the stopping by the detent lever 33 is removed, a greater actuating force than a normal actuating force is required. Therefore, the modified circuit is designed to apply a voltage $Va+Vb$ higher than a normal driving voltage Va across the piezo-electric actuating element $Bi_2$.

Figure 16:
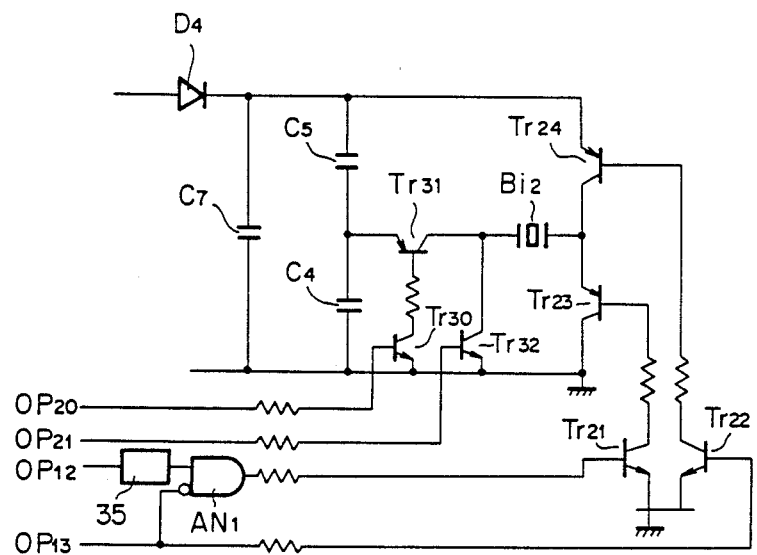
FIG. 16 is a circuit diagram showing a lens actuating circuit in a modified form.
Figure 17:
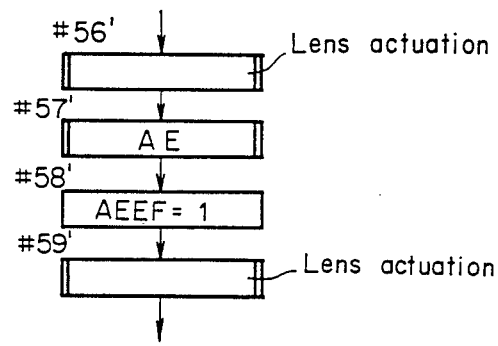
FIG. 17 is a flow chart illustrating peculiar operation of a camera which incorporates the lens actuating circuit of FIG. 16.

A construction of a lens actuating circuit for achieving this is shown in FIG. 16. In the construction shown in FIG. 16, a capacitor $C_7$ and transistors $Tr_{30}$, $Tr_{31}$, $Tr_{32}$ are added to the construction of FIG. 9, and also the microcomputer 1 has additional output terminals $OP_{20}$, $OP_{21}$. Operation of the lens actuating circuit will be described with reference to modified or changed portions of flow charts of the microcomputer 1 shown in FIGS. 17 and 18. Such modified portions include #56 to #59 of FIG. 12c and the subroutine of "LENS ACTUATION" shown in FIG. 14. At first, steps #56 to #59 of FIG. 12c are changed as shown in FIG. 17. Referring to FIG. 17, at first at #56', the program advances to the subroutine of "LENS ACTUATION" in order to actuate the lens to the predetermined position, and then at #57', the subroutine of "AE" is executed to effect exposure controlling. Then at #58', a flag AEEF indicative of completion of exposure is set, and then at #59', the program advances again to the subroutine of "LENS ACTUATION" in order to reset the lens. Other operations are identical to those of the flow chart of FIGS. 12a to 12c.

Figure 18:
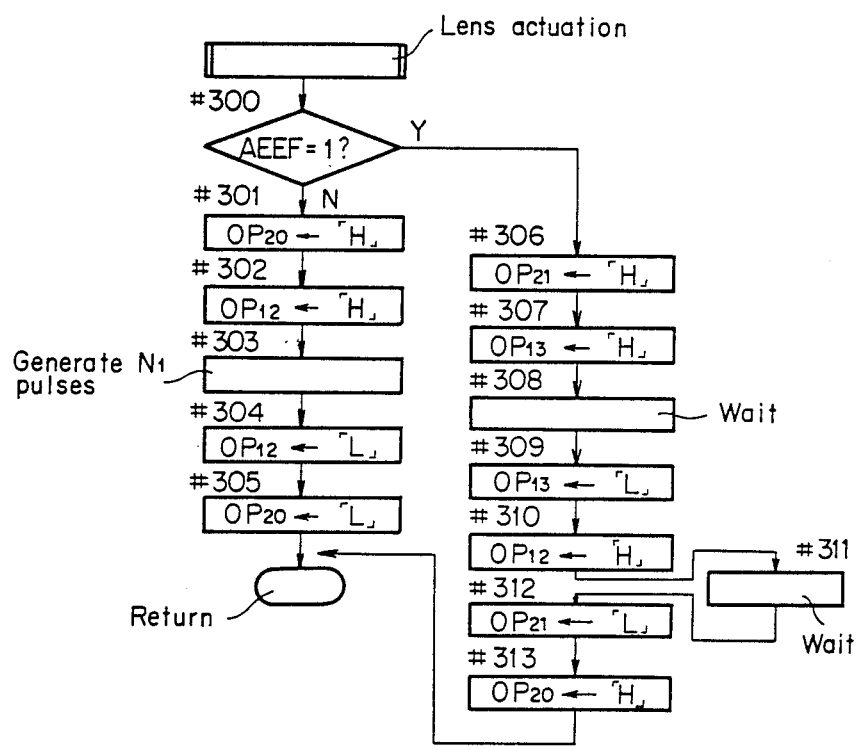
FIG. 18 is a flow chart illustrating a subroutine of "LENS ACTUATION" of FIG. 17.

Meanwhile, in the subroutine of "LENS ACTUATION" shown in FIG. 18, the microcomputer 1 judges at first at #300 whether the flag AEEF is in the set state or not, and where the flag AEEF is not in the set state, the output terminal $OP_{20}$ of the microcomputer 1 is changed, at #301, into the "H" level to turn the transistors $Tr_{30}$, $Tr_{31}$ on, and then at #302, the output terminal $OP_{13}$ is changed into the "H" level whereafter the number N1 of pulses are produced, at #303, from the output terminal $OP_{13}$. After then, at #304 and #305, the output terminals $OP_{12}$, $OP_{20}$ are changed into the "L" level, respectively, and then the routine of FIG. 17 is reentered. On the contrary, where the flag AEEF is in the set state at #300, the output terminal $OP_{21}$ is changed, at #306, into the "H" level to turn the transistor $TR_{32}$ on so that a voltage of 0 volts is applied to the fixed end of the piezo-electric actual element $Bi_2$. Subsequently, at #307, the output terminal $OP_{13}$ is changed into the "H" level to apply a voltage of $Va+Vb$ to the other end of the piezo-electric actuating element $Bi_2$ to increase the amount of displacement of the piezo-electric actuating element $Bi_2$. At #308, the microcomputer 1 waits until the piezo-electric actuating element $Bi_2$ is driven to displace itself by the intended amount, and at #309, the output terminal $OP_{13}$ is changed into the "L" level to stop application of the voltage across the piezo-electric actuating element $Bi_2$. Then at #310, the output terminal $OP_{12}$ is changed into the "H" level to short the piezo-electric actuating element $Bi_2$ to displace the piezo-electric actuating element $Bi_2$ back to its initial position. Then at #311, the microcomputer 1 waits for a time necessary for such returning displacement, and then at #312, the output terminal $OP_{21}$ is changed into the "L" level to turn the transistor $Tr_{32}$ off. Further at #313, the output terminal $OP_{20}$ is changed into the "H" level to apply a reverse voltage across the piezo-electric actuating element $Bi_2$ to further drive the piezo-electric actuating element $Bi_2$ in the reverse direction in order to reduce the offset or amount of displacement of the piezo-electric actuating element $Bi_2$ as near to 0 as possible, whereafter the program returns to the routine of FIG. 17.

Further, in the preceding embodiment, while the photometry switch $S_1$ is on, boosting for the piezo-electric actuating element driving capacitor is performed and a time required for such boosting is measured in order to judge a degree of exhaustion of the battery. However, it is also possible to perform boosting of the piezo-electric actuating element driving capacitor while the release switch $S_2$ is on.

Figure 19:
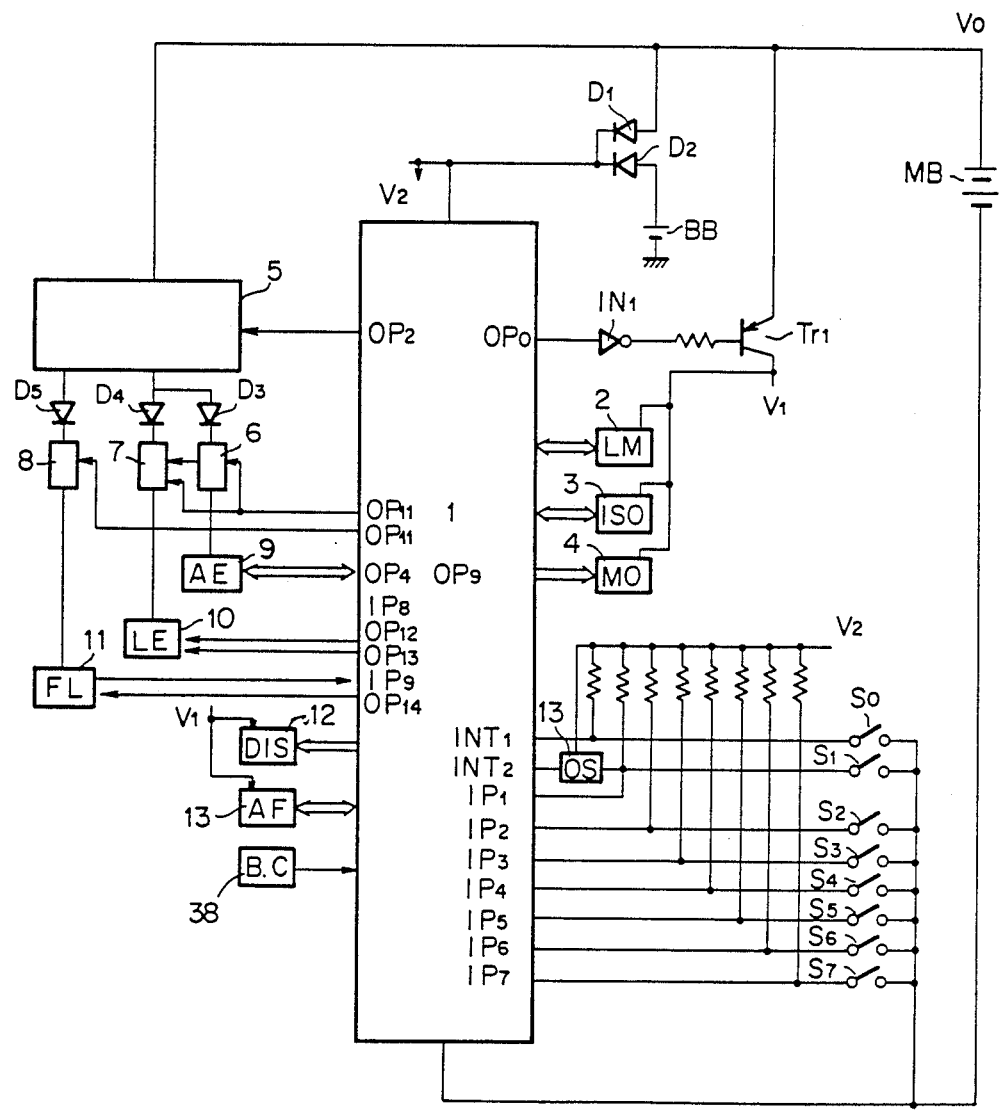
FIG. 19 is a circuit diagram showing an entire electric circuit of a camera according to another embodiment of the invention.
Figure 20A:
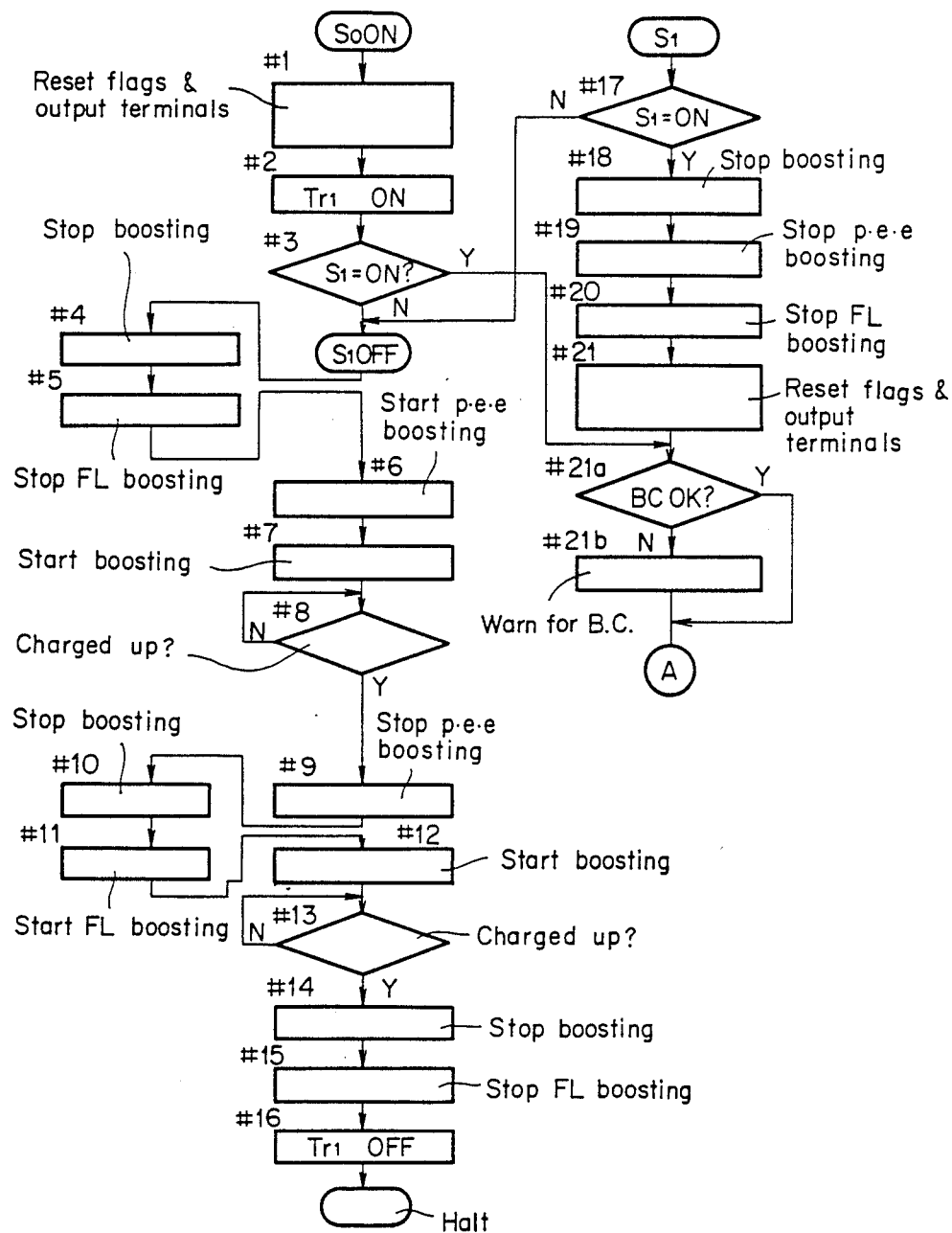
FIGS. 20a, 20b and 20c are flow charts of an interrupt routine illustrating a flow of operations of the camera of FIG. 19.
Figure 20B:
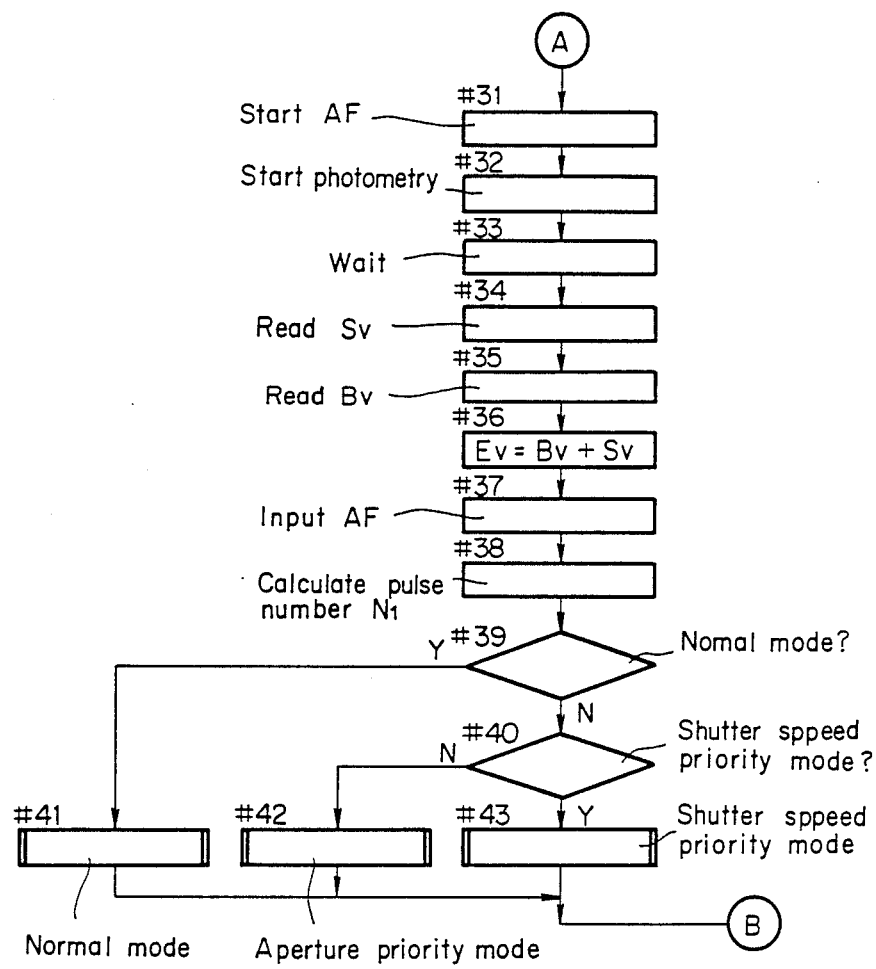
Figure 20C:
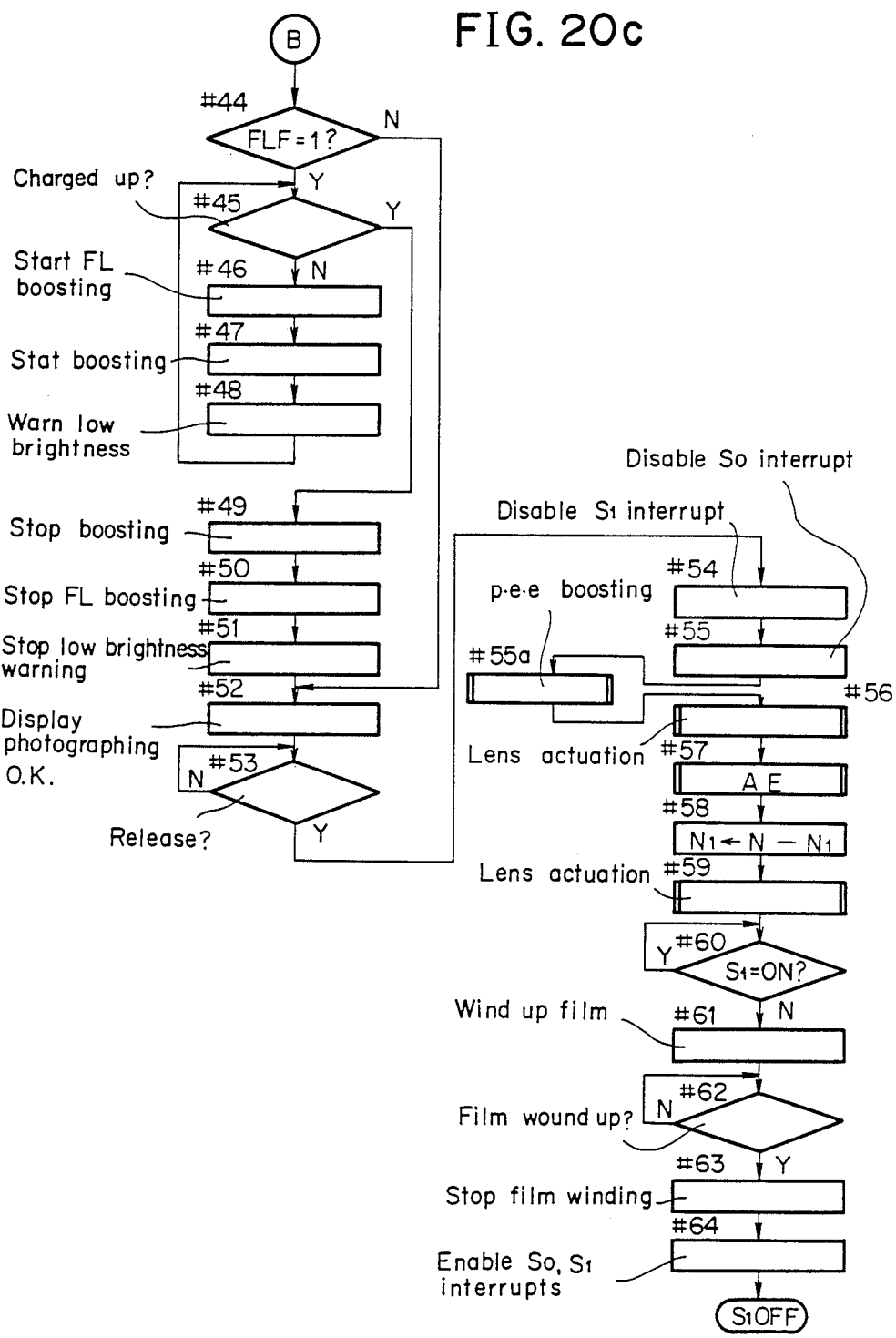
Figure 21:
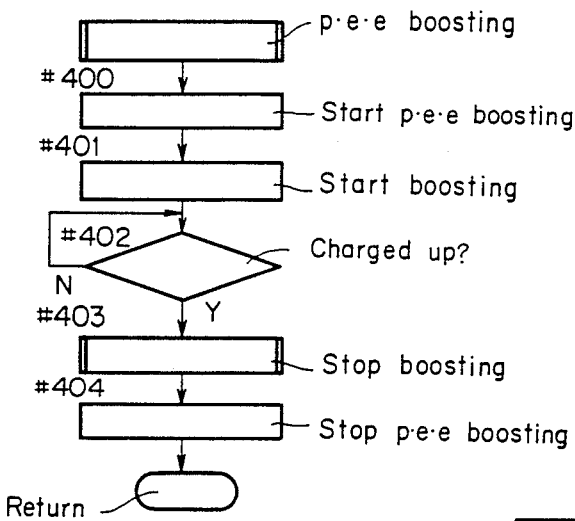
FIG. 21 is a flow chart illustrating a subroutine of "P.E.E. BOOSTING" of the flow chart of FIG. 20c.

In such a case, however, it is not desirable to judge a degree of exhaustion of the battery in response to turning on of the release switch $S_2$ because the voltage of the battery is not yet stable just after releasing of the shutter by turning on of the release switch $S_2$. Accordingly, in order to detect a voltage of the battery, an additional voltage detecting circuit may preferably be provided. A block diagram of a circuit in which such a voltage detecting circuit 38 is additionally provided is shown in FIG. 19, and flow charts illustrating a routine of operation of the same are illustrated in FIGS. 20a, 20b and 20c. The flow charts of FIGS. 20a to 20c are modified or changed at two portions comparing with those of FIGS. 12a to 12c. One of the two portions involves addition after #21 of #21a and #21b wherein at #21a a signal from the voltage detecting circuit 38 is received to detect a voltage of the battery and then if a drop in voltage is found, warning of such dropping in volt is given at #21b. Accordingly, #22 to #24 of FIG. 12a and #25 to #30 of FIG. 12b are omitted here. The remain one of the two modified portions involves addition after #55 as #55a of a subroutine of "P.E.E. BOOSTING" for boosting the piezo-electric actuating element driving capacitor. Details of the subroutine are illustrated in FIG. 21.

In the subroutine of "P.E.E. BOOSTING" of FIG. 21, at first at #400, the output terminal $OP_{11}$ of the microcomputer 1 is changed into the "H" level to turn the switching circuits 6, 7 on to start boosting of the piezo-electric actuating element driving capacitors $C_2$, $C_4$, $C_5$, and then at #401, the output terminal $OP_2$ is changed into the "H" level to start a boosting operation of the boosting circuit 5. Then at #402, the microcomputer 1 waits for a charging up completion signal to be delivered from the voltage detecting circuit $BC_1$, and upon reception of such a charging up completion signal, the microcomputer 1 changes, at #403, the output terminal $OP_2$ thereof into the "L" level to stop the boosting operation of the boosting circuit 5, whereafter at #404, the output terminal $OP_{11}$ is changed into the "L" level to turn the switching circuit 6, 7 off to stop boosting of the piezo-electric actuating element driving capacitors $C_2$, $C_4$, $C_5$. After then, the routine of FIG. 20c is reentered.

Figure 22:
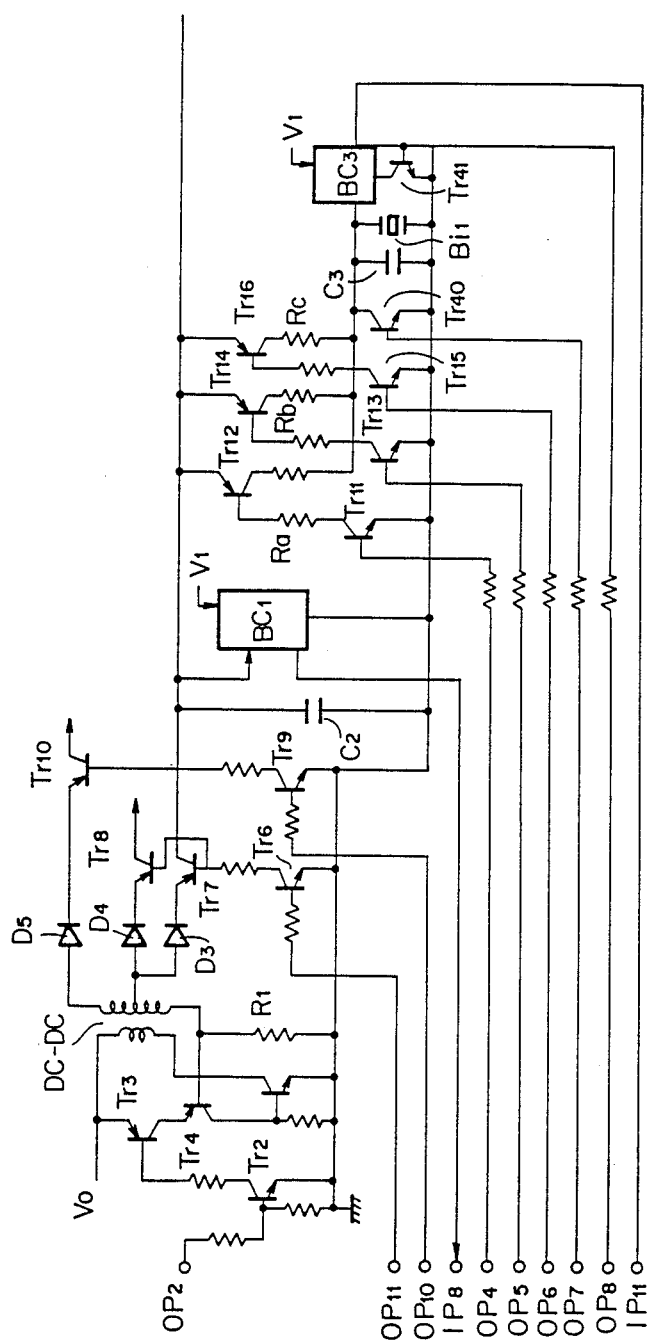
FIG. 22 is a circuit diagram showing an exposure controlling circuit in a modified form.

Referring now to FIG. 22, there is shown an exposure controlling circuit which is a modification of the circuit shown in FIG. 8. In the modified circuit of FIG. 22, the exposure controlling piezo-electric actuating element $Bi_1$ is used such that it may be offset or displaced from the position of the displacement "0". Accordingly, a reverse voltage is applied across the piezo-electric actuating element $Bi_1$ in order to compensate for an offset by which the piezo-electric actuating element $Bi_1$ is not returned to the displacement "0" position (initial position) due to its own hysteresis. Therefore, in the circuit shown in FIG. 22, selected as the initial position is a particular position a little farther from a position occupied by an amount of displacement (point (a) indicated in FIG. 7a) which remains when the piezo-electric actuating element $Bi_1$ is shorted after a voltage of 200 volts has been applied across the piezo-electric actuating element $Bi_1$, and the shutter is actuated utilizing displacement of the piezo-electric actuating element $Bi_1$ from the particular position. To this end, a predetermined fixed voltage is applied across the piezo-electric actuating element $Bi_1$ to displace the latter to the particular position in prior to releasing of the shutter, thereby to eliminate an influence of a change in amount of displacement due to the hysteresis by a change in voltage applied. A circuit diagram of a circuit to realize this is shown in FIG. 22 and flow charts thereof are shown in FIGS. 23a, 23b, 23c, 24 and 25. Now, operation of the circuit shown in FIG. 22 will be described with reference to the flow charts of FIGS. 23a to 25.

Referring to the circuit diagram of FIG. 22, the difference from the circuit diagram of the exposure controlling circuit shown in FIG. 8 will be described. At first, in the exposure controlling circuit of FIG. 22, a transistor $Tr_{40}$ is connected in parallel to the piezo-electric actuating element $Bi_1$ while the transistors $Tr_{17}$, $Tr_{18}$, $Tr_{19}$ shown in FIG. 8 are omitted. Further, FIG. 22 additionally includes a voltage detecting circuit $BC_3$ for detecting a charged voltage of the piezo-electric actuating element driving capacitor $C_3$, and a transistor $Tr_{41}$ for controlling power supply to the voltage detecting circuit $BC_3$. The voltage detecting circuit $BC_3$ delivers a charging up completion signal to the input terminal $IP_{11}$ of the microcomputer 1 when charging up of the capacitor $C_3$ is completed. Meanwhile, the transistors $Tr_{40}$, $Tr_{41}$ are controlled by the output terminals $OP_7$, $OP_8$, respectively, of the microcomputer 1. Further, the output terminal $OP_9$ of the microcomputer 1 for controlling the transistor $Tr_{19}$ shown in FIG. 8 is omitted.

Figure 23A:
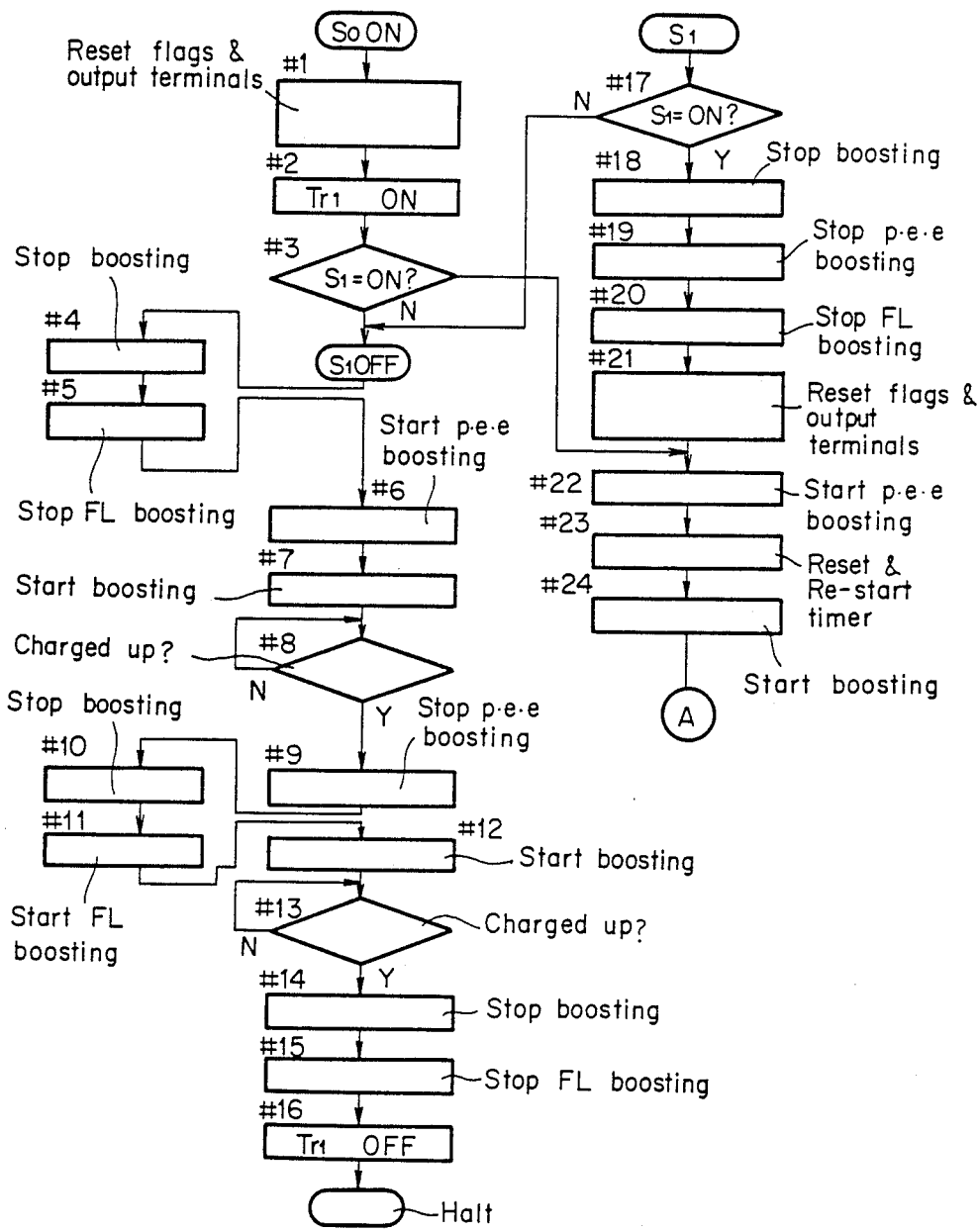
FIGS. 23a, 23b and 23c are flow charts of an interrupt routine illustrating a flow of operations of a camera which incorporates the exposure controlling circuit of FIG. 22.
Figure 23B:
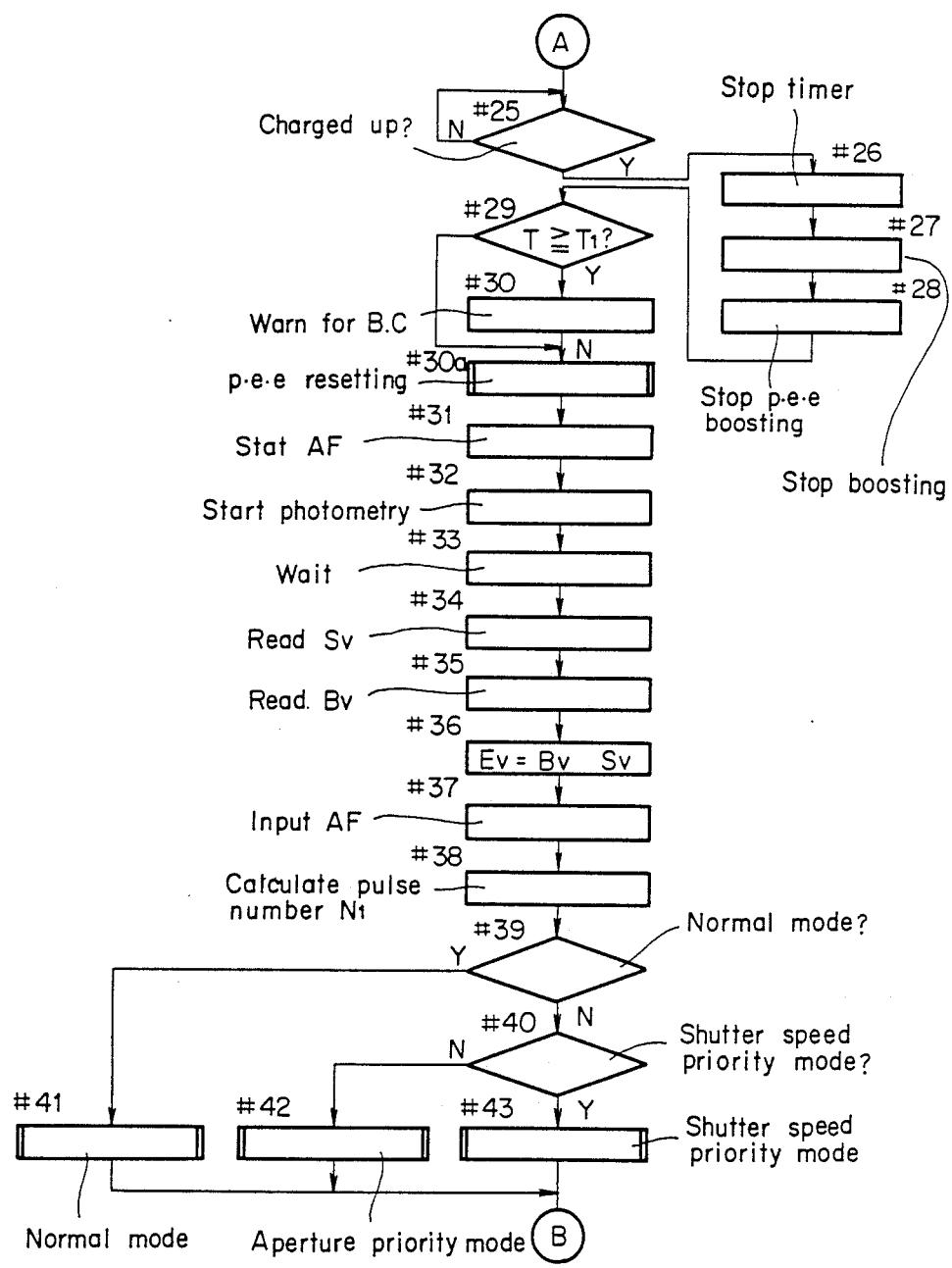
Figure 23C:
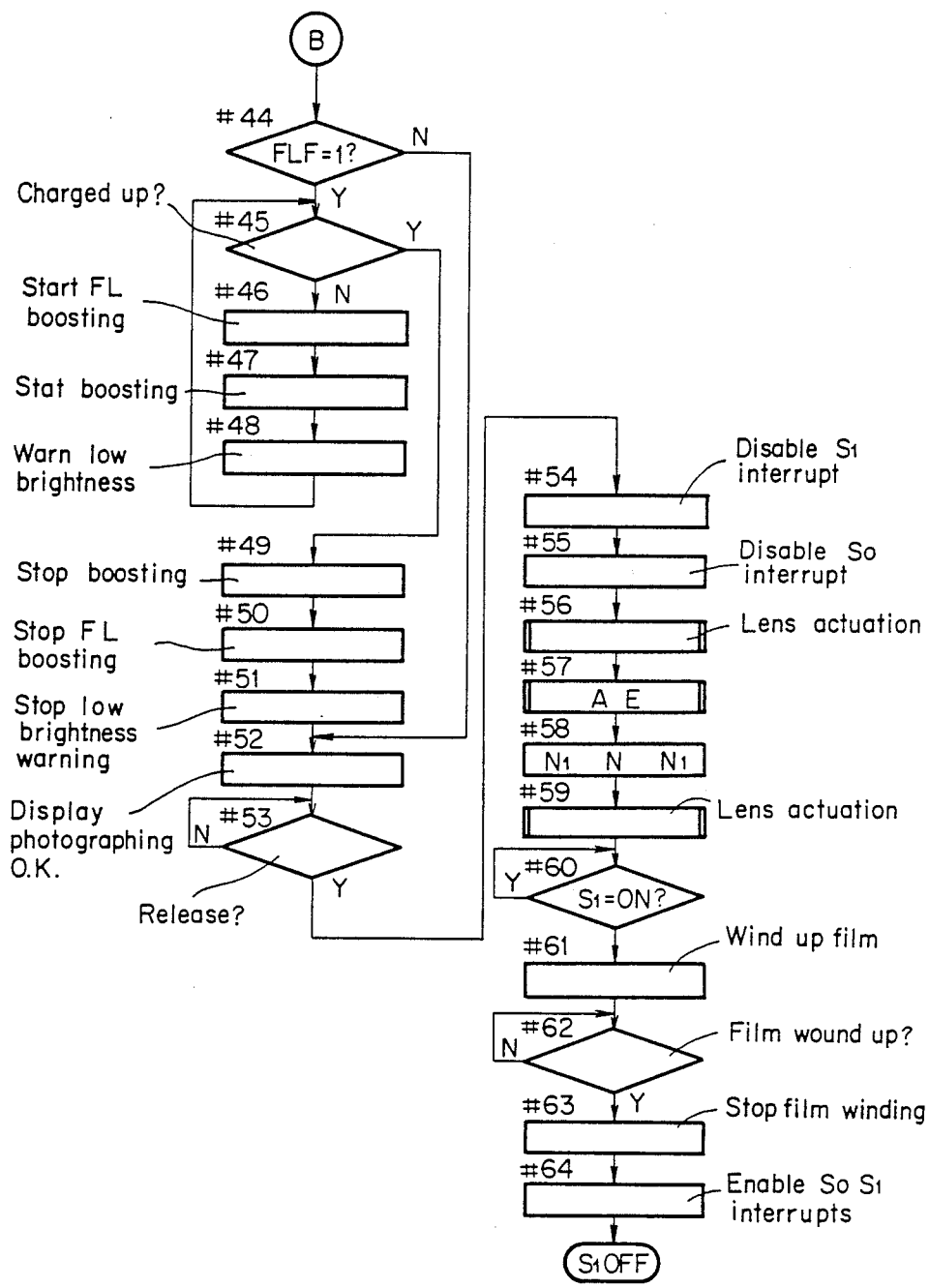
Figure 24:
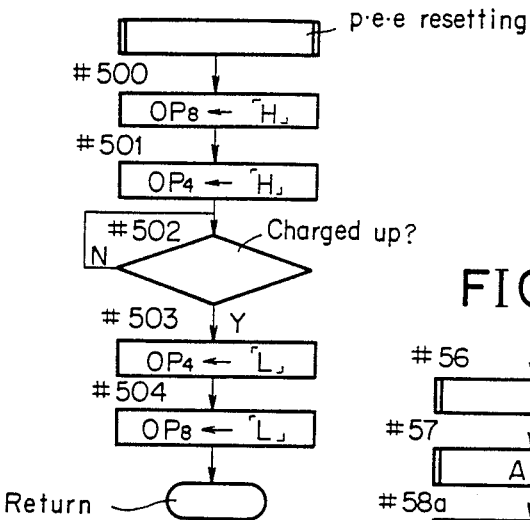
FIG. 24 is a flow chart illustrating a subroutine of "P.E.E. RESETTING" of the flow chart of FIG. 23b.

Comparison between the flow chart of FIGS. 23a to 23c and the flow chart of FIGS. 12a to 12c illustrates a difference in that a subroutine of "P.E.E. RESETTING" for resetting the piezo-electric actuating elements $Bi_1$, $Bi_2$ is added as #30a after #30 as seen in FIG. 23b. At first, in the subroutine of "P.E.E. RESETTING" shown in FIG. 24, the microcomputer 1 changes, at #500, the output terminal $OP_8$ thereof into the "H" level to turn the transistor $Tr_{41}$ on to supply electric power to the voltage detecting circuit $BC_3$ in order to cause the voltage detecting circuit $BC_3$ to detect a voltage. The voltage to be detected is a voltage necessary to move the piezo-electric actuating element $Bi_1$ to its particular position specified as above. Then at #501, the output terminal $OP_4$ is changed into the "H" level to turn the transistors $Tr_{11}$, $Tr_{12}$ on in order to apply a voltage across the piezo-electric actuating element $Bi_1$ via the transistors $Tr_{11}$, $Tr_{12}$ to drive the piezo-electric actuating element $Bi_1$. Then at #502, the microcomputer 1 waits for a charging up completer signal to be received at the input terminal $IP_{11}$ thereof from the voltage detecting circuit $BC_3$, and upon reception of such a signal, the output terminals $OP_4$, $OP_8$ are successively changed, at #503 and #504, into the "L" level to stop application of the voltage across the piezo-electric actuating element $Bi_1$ and turn the voltage detecting circuit $BC_3$ off, whereafter the routine shown in FIG. 23b is re-entered.

Figure 25:
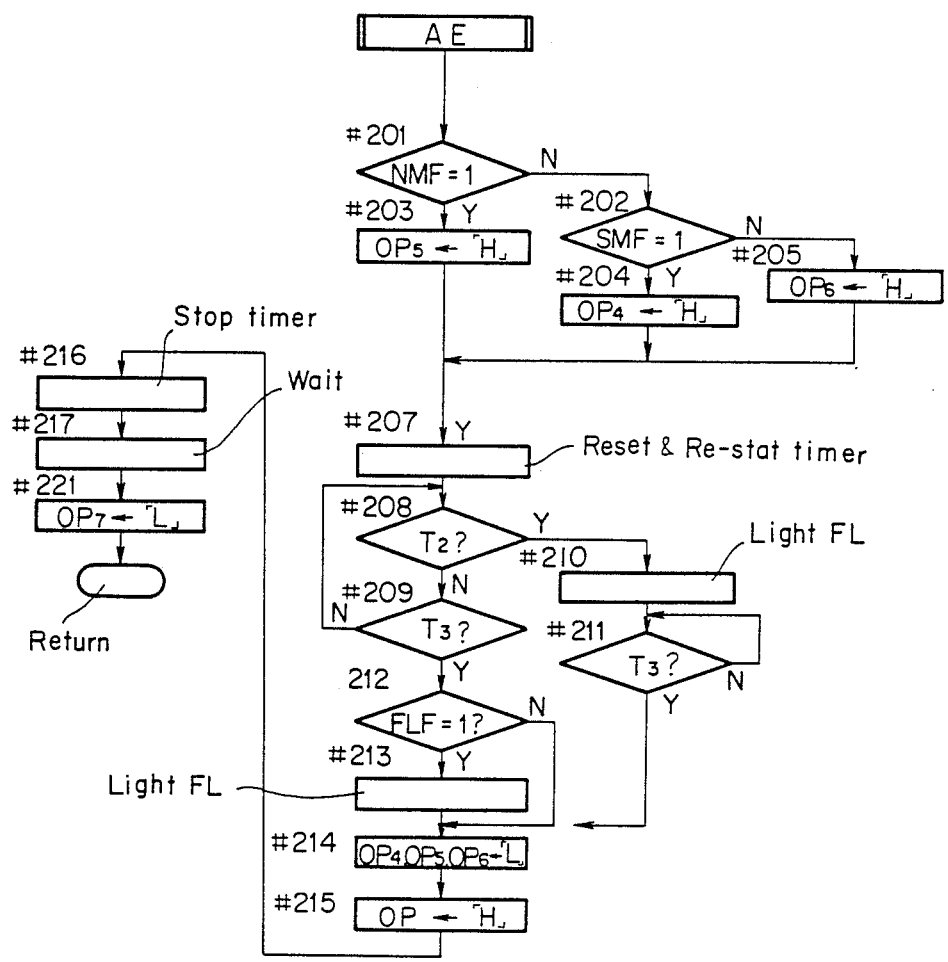
FIG. 25 is a flow chart illustrating a subroutine of "AE" of the flow chart of FIG. 23c.

Further, contents of the subroutine of "AE" shown at #57 of FIG. 23c which corresponds to #57 of FIG. 12c are modified. The modified subroutine of "AE" is shown in FIG. 25. The subroutine of "AE" shown in FIG. 25 is substantially identical to the subroutine shown in FIG. 15 and is different at first in that #200 and #218 to #220 are omitted because a reverse voltage is not applied across the piezo-electric actuating element $Bi_1$. Further, the switch $S_5$ for detecting returning of the piezoelectric actuating element $Bi_1$ to its initial position in order to set the piezo-electric actuating element $Bi_1$ to its initial position is not necessitated nor such return is monitored. It is to be noted that as such modification is made, a step of operation to change the output terminal $OP_9$ of the microcomputer 1 into the "L" level, which is included in #221 of FIG. 15, is omitted in #221 of FIG. 25.

Here, in the lens actuating mechanism using the ratchet of the endless type shown in FIGS. 4a and 4b and in the control of the lens actuating mechanism, returning of the lens to its initial position is achieved by feeding the ratchet by driving the piezo-electric actuating element $Bi_2$ by a number of steps which is obtained by subtracting a number N1 of pulses corresponding to the number of actuated steps necessitated for focusing from a number N of pulses corresponding to the number of steps necessary for the ratchet to cause the lens to make one reciprocation. However, where the modified form shown in FIG. 6 is employed, because the switch 34 for detecting that the lens is returned to its initial position is provided, the piezo-electric actuating element $Bi_2$ may be controlled such that when the switch 34 is turned on, driving thereof is stopped to stop movement of the lens.

Figure 26:
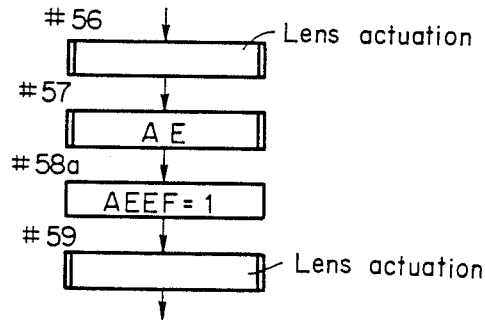
FIG. 26 is a flow chart of part of an interrupt routine illustrating peculiar operation of a camera which incorporates the lens actuating mechanism of FIG. 6.
Figure 27:
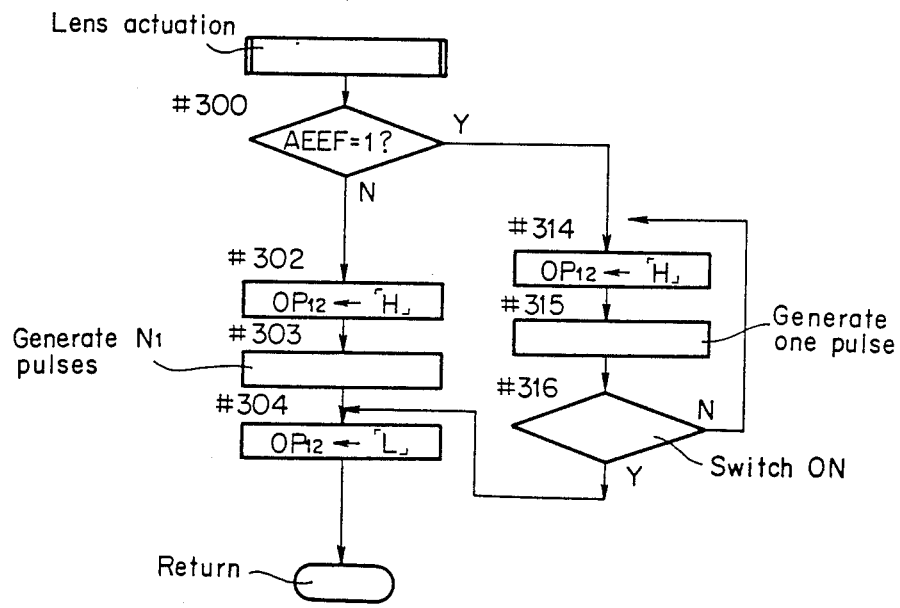
FIG. 27 is a flow chart illustrating a subroutine of "LENS ACTUATION" of the flow chart of FIG. 26.

FIGS. 26 and 27 show flow charts illustrating operation to achieve such control. FIG. 26 illustrates only modified portions of the flow chart shown in FIGS. 12a to 12c, and only one difference is that, comparing with the flow charts shown in FIGS. 12a to 12c, #58 is omitted and a step #58a for setting the flag AEEF indicative of completion of exposure is inserted instead. Further, FIG. 27 illustrates modifications of the subroutine of "LENS ACTUATION" shown in FIG. 18.

Referring to FIG. 27, at first at #300, the microcomputer 1 judges, similarly to the flow shown in FIG. 18, whether or not the flag AEEF indicative of completion of exposure is set. Then, in case the flag AEEF is not in the set state, the program advances to #302, then to #303 and then to #304, but description of operations at these steps is omitted herein because they are identical to those of the preceding embodiment shown in FIG. 18. On the contrary, in case the exposure completion flag AEEF is in the set state at #300, the output terminal $OP_{12}$ is changed, at #314, into the "H" level, and then at #315, a single pulse is delivered from the output terminal $OP_{13}$ to feed the ratchet by one tooth space. Then at #316, the microcomputer 1 judges whether or not the switch 34 indicative of returning of the lens to its initial position is on, and in case the switch 34 is not on, the program returns to #314 to repeat the sequence of #314 to #316. Thus, when the switch 34 is turned on, the output terminal $OP_{12}$ is changed into the "L" level, and then the routine or FIG. 26 is re-entered. In this instance, the microcomputer 1 shown in FIG. 1 necessarily has an input terminal for receiving an on/off signal of the switch 34.

Here, in the exposure controlling circuit and its operation illustrated in FIGS. 22 to 25, a predetermined voltage is applied across the piezo-electric actuating element $Bi_1$ in order to fix the initial position of the latter. However, it is alternatively possible to employ a method of fixing the initial position of the piezo-electric element $Bi_1$ wherein at first a predetermined fixed voltage is applied across the piezo-electric actuating element $Bi_1$ to once displace the same a fixed amount from the position "0" shown in FIG. 7a and then the piezo-electric actuating element $Bi_1$ is shorted to return the same to a position of the hysteresis when the voltage is applied.

Accordingly, the applied voltage is required to be higher than a voltage necessary to actuate the piezo-electric actuating element $Bi_1$ to a position of the hysteresis (point (a) in FIG. 7a) the piezo-electric actuating element $Bi_1$ has when a highest available voltage is applied across the same. It is a matter of course that the voltage varies depending upon the type of piezo-electric actuating element used and an applicable highest voltage.

An exposure controlling circuit necessary for putting the method into operation is identical to that of FIG. 22, and flow charts illustrating operations of the microcomputer 1 are also same with respect to FIGS. 23 and 25. Difference resides only in the subroutine of "P.E.E. RESETTING" of FIG. 24, and such a modified flow chart is shown in FIG. 28.

Figure 28:
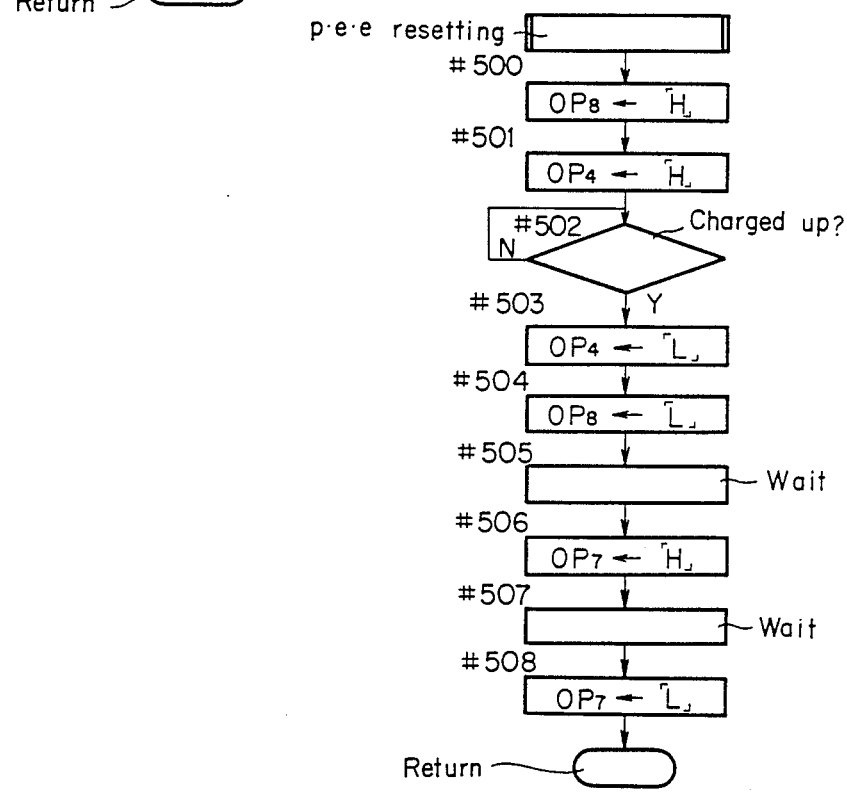
FIG. 28 is a flow chart illustrating a modified subroutine of "P.E.E. RESETTING" of the camera which incorporates the exposure controlling circuit of FIG. 22.

In the flow chart of FIG. 28, at first at #500, the microcomputer 1 changes the output terminal $OP_8$ thereof into the "H" level to turn the voltage detecting circuit $BC_3$ on, and then #501, changes the output terminal $OP_4$ into the "H" level to start charging of the capacitor $C_3$. Then at #502, the microcomputer 1 waits detection of completion of charging up of the capacitor $C_3$ by the voltage detecting circuit $BC_3$, and when the charged voltage of the capacitor $C_3$ reaches a predetermined level, the microcomputer 1 turns the output terminals $OP_4$, $OP_8$ thereof off at #503 and #504, respectively, whereafter it waits, at #505, displacement of the piezo-electric actuating element $Bi_1$ by a predetermined amount. Then at #506, the microcomputer 1 changes the output terminal $OP_7$ thereof into the "H" level to short the piezo-electric actuating element $Bi_1$ and then waits, at #507, for a time sufficient for the piezo-electric actuating element $Bi_1$ to return to the predetermined position of the hysteresis. Thereafter, the microcomputer 1 changes the output terminal $OP_7$ thereof into the "L" level, and then the routine of FIG. 23b is re-entered. The charged voltage may be such a voltage as described hereinabove. It is to be noted that where an applicable maximum voltage is applied to the piezo-electric actuating element $Bi_1$, the voltage detecting circuit $BC_3$ and the transistor $Tr_{41}$ both shown in FIG. 22 may be omitted and #500 and #504 in the flow chart of FIG. 28 may also be omitted. It is further to be noted that in this instance the shutter is held from opening by one of the projections 29c of the cam ring 29 provided in the lens actuating mechanism as shown in FIG. 4a.

A further embodiment of the invention is shown in FIGS. 29 to 36. In the camera of the embodiment, a predetermined position of a shutter blade is detected in order to control operation of the camera in response to a position of the shutter blade.

Figure 29:
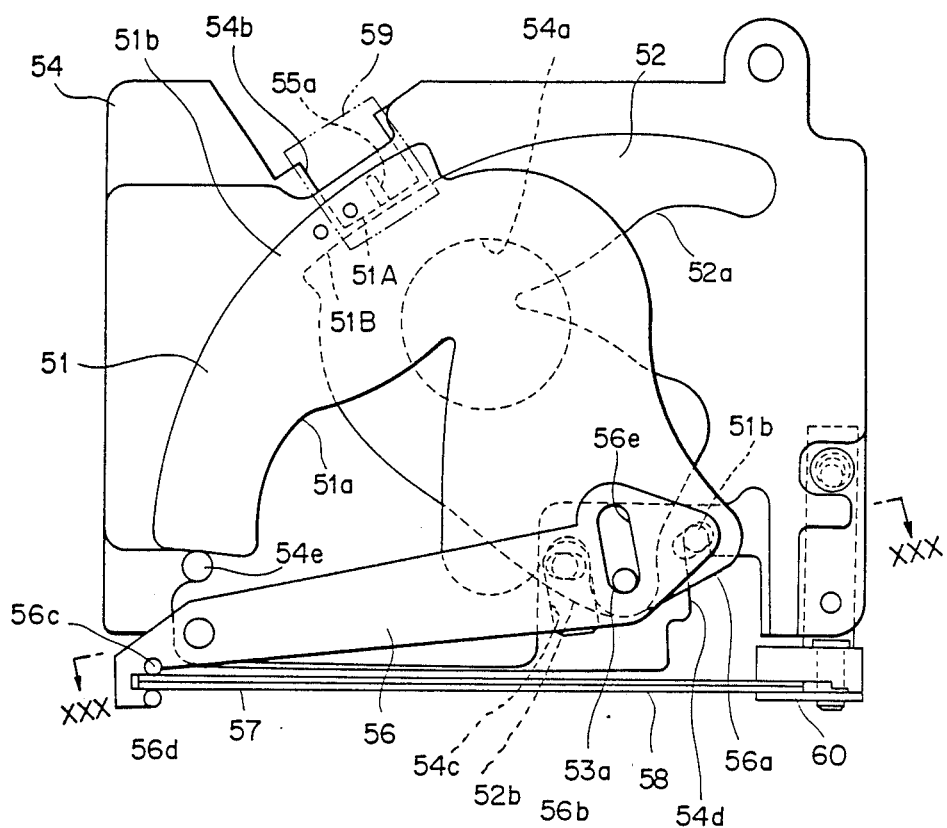
FIG. 29 is a front elevational view showing a mechanism for actuating a shutter of a camera according to a further embodiment of the invention.
Figure 30:
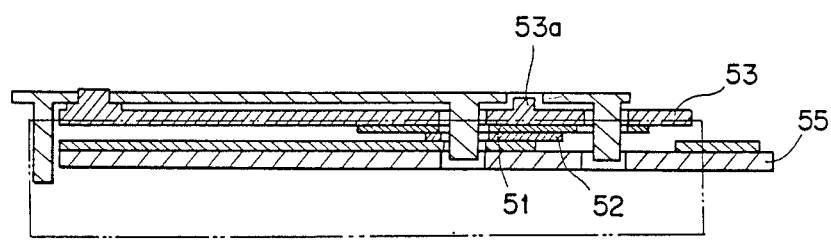
FIG. 30 is a cross sectional view taken along line XXX—XXX of FIG. 29.
Figure 31:
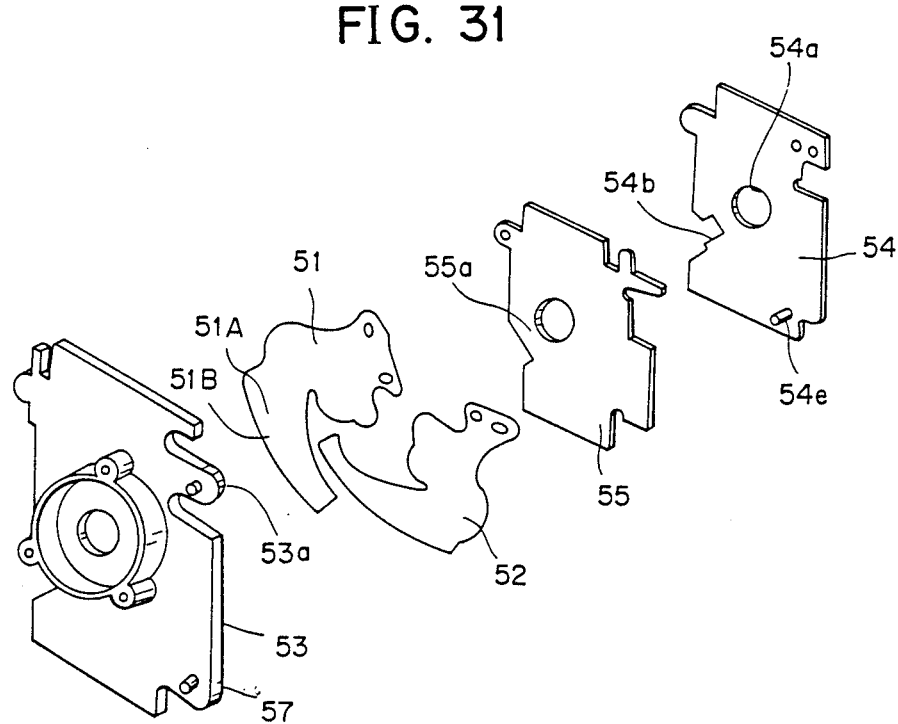
FIG. 31 is a fragmentary perspective showing the mechanism of FIG. 29.

Referring first to FIGS. 29 to 31, a mechanism for actuating a shutter using a piezo-electric actuating element is shown. The mechanism includes a pair of shutter blades 51, 52 mounted for pivotal motion around a common support shaft 53a secured to a shutter front plate 53 only a necessary part of which is shown in FIGS. 29 to 31 in order to facilitate the understanding of construction of the mechanism. As seen in FIG. 29, the shutter blades 51, 52 may have substantially symmetrical shapes and be disposed in substantially symmetrical positions relative to a line interconnecting the center of an exposure aperture 54a of a shutter base plate 54 and the support shaft 53a except a portion of the shutter blade 51 described below.

As seen in FIGS. 30 and 31, the shutter blades 51, 52 are accommodated in a spacing formed between the shutter front plate 53 and an intermediate plate 55 which is located between the shutter front plate 53 and the shutter base plate 54. The shutter blades 51, 52 have V-shaped cutaway openings 51a, 52a formed therein, respectively, so that as the shutter blades 51, 52 are pivoted in a clockwise direction and in a counterclockwise direction, respectively, that is, in an aperture opening direction, around the common shaft 53a, the V-shaped cutaway openings 51a, 52a will open the exposure aperture 54a of the shutter base plate 54a.

An opening and closing lever 56 is supported for pivotal motion around a fixed shaft 57 mounted on the shutter front plate 53. A pair of engaging pins 56a, 56b are mounted on the opening and closing lever 56 and are engaged with elongated holes 51b, 52b formed in the shutter blades 51, 52, respectively, so that as the opening and closing lever 56 is pivoted in a counterclockwise direction around the shaft 57 from a position shown in FIG. 29 to move the engaging pins 56a, 56b thereon upwardly in FIG. 29, the shutter blades 51, 52 are pivoted in the aperture opening direction around the shaft 53a. The opening and closing lever 56 further has an elongated hole 56e formed at a portion thereof between the engaging pins 56a, 56b, and the support shaft 53a for the shutter blades 51, 52 extends through the elongated hole 56c to allow but limit such pivotal motion of the opening and closing lever 56 as described above. The engaging pins 56a, 56b on and the elongated hole 56c in the opening and closing lever 56 are located so as to provide symmetrical motions of the shutter blades 51, 52 relative to the line passing the center of the exposure aperture 54a and the common support pin 53a. In order to prevent the engaging pins 56a, 56b from interfering with the shutter base plate 54 upon pivotal motion of the opening and closing lever 56, the shutter base plate 54 has two cutaway portions 54c, 54d formed therein.

A pair of pins 56c, 56d are mounted at the other end portion of the opening and closing lever 56, and an end of a piezo-electric actuating element 58 is received between the pins 56c, 56d. The piezo-electric actuating element 58 is secured at the other end thereof to a holding plate 60 adjustably secured to the shutter base plate 54.

Accordingly, if a voltage is applied across the piezo-electric actuating element 58, the free end thereof will be curved downwardly in FIG. 29 to pivot the opening and closing lever in the counterclockwise direction around the shaft 57 to pivot the shutter blades 51, 52 in the aperture opening direction around the shaft 53a thereby to open the exposure aperture 54a of the shutter base plate 54.

The shutter blade 51 has a greater radius or dimension from the shaft 53a than the other shutter blade 52, and a pair of small holes 51A, 51B are perforated on a same circumferential line of such radial extension 51b of the shutter blade 51 around the shaft 53a. An elongated hole 55a is formed at a position of the intermediate plate 55 on the same circumferential line, and an optical detecting element 59 including a light emitting element and a light receiving element as in a conventional photocoupler is secured adjacent a further cutaway portion 54b of the shutter base plate 54 and is positioned such that a beam of light emitted from the light emitting element thereof may be received by the light receiving element thereof passing through the elongated hole 55a of the intermediate plate 55 and the small hole 51A or 51B when the elongated hole 55a and the small hole 51A or 51B are positioned in register with each other. Accordingly, when the small hole 51A of the shutter blade 51 is brought into register with the elongated hole 55a of the intermediate plate 55 during pivotal motion of the shutter blades 51, 52 in the aperture opening direction, an electric pulse is produced from the optical detecting element 59, and then when the second small hole 51B is brought into register with the elongated hole 55a, a second electric pulse is produced from the optical detecting element 59. In particular, the small hole 51A is positioned on the shutter blade 51 so that a first electric pulse may be produced when the shutter blades 51, 52 are pivoted in the aperture opening direction to a first predetermined position just before they begin to provide an opening for exposure, or in other words, so as to detect such a specific position of the shutter blades 51, 52. Such a first electric pulse may be used as a reference signal from which measurement of exposure time of the camera as hereinafter described is to be started. Meanwhile, the other small hole 51B is positioned so as to detect a second predetermined position such as a minimum opening position at which at least photographing is allowed. The latter position signal is also used for control of the camera as described hereinbelow.

In an aperture closing direction which is opposite to the aperture opening direction, the shutter blades 51, 52 can be pivoted until an end of the shutter blade 51 is engaged with and stopped by a pin 54e securely mounted on the shutter base plate 54. However, pivotal motion of the shutter blades 51, 52 in the aperture closing direction may alternatively be limited by the support shaft 53a engaging with an end face of the elongated hole 56c of the opening and closing lever 56.

In operation, a negative or reverse voltage may first be applied to the piezo-electric actuating element 58 to pivot the shutter blades 51, 52 in the aperture closing direction to the hole or limit position defined by the pin 54e. Subsequently, a positive voltage is applied across the piezo-electric actuating element 58 to pivot the shutter blades 51, 52 in the aperture opening direction until a selected opening of the shutter aperture is reached. During such pivotal motion of the shutter blades 51, 52 in the aperture opening direction, the optical detecting element 59 first detects the first small hole 51A of the shutter blade 51 to develop an electric pulse signal indicating arrival of the shutter blades 51, 52 at the first predetermined position just before they begin to provide an opening for exposure and then detects the second small hole 51B to develop a second electric pulse signal indicating arrival at the second predetermined position. After then, a negative voltage is applied again across the piezo-electric actuating element 58 to pivot the shutter blades 51, 52 to their respective initial positions.

Now, construction of an electric circuit of the camera will be described with reference to FIG. 32. The circuit shown includes a microcomputer 61 which controls sequencing of the camera and calculates an exposure of the camera. The circuit further includes a photometry circuit 62 for measuring a brightness of an object of photographing via a lens (not shown) incorporated in the camera independently of a photographing lens and for producing a digital signal of the measured brightness value Bv represented in A.P.E.X. system to the microcomputer 61. A film sensitivity reading circuit 63 reads a sensitivity Sv of a film represented in A.P.E.X. system and produces a digital signal of the film sensitivity Sv thus read to the microcomputer 61. A position detector 64 corresponding to the optical detecting element 59 described above detects a degree of opening of the shutter and produces an electric pulse. A distance measuring circuit 65 measures a distance to an object and produces a digital signal indicative of the measured distance to the microcomputer 61. A flash circuit 66 is of a known type and includes therein a boosting circuit for boosting a voltage of a battery E which serves as a power source to a level required to drive the piezo-electric actuating element 58 to actuate the shutter described above and to drive a flash device to emit flash light. The flash circuit 66 thus receives a signal from the microcomputer 61 and causes the flash device to emit flash light. The circuit of FIG. 32 further includes a driving circuit 67 for driving the piezo-electric actuating element 58, which will be hereinafter described. A lens driving circuit 68 is also provided and operates in response to information of a measured distance to drive a lens to move to a specified position.

The circuit further includes a reverse charging preventing diode $D_{51}$, a backup capacitor C for the microcomputer 61, and a power supply transistor $Tr_{51}$ which becomes conductive to supply a power of voltage $V_{51}$ to the photometry circuit 62, the film sensitivity reading circuit 63, the position detector 64, the distance measuring circuit 65, the piezo-electric actuating element driving circuit 67 and the lens driving circuit 68. Meanwhile, the flash circuit 66 is supplied with power of a voltage $V_{50}$ directly from the power source E, and the piezo-electric actuating element driving circuit 67 is additionally supplied with power of 200 volts from the flash circuit 66.

Figure 33A:
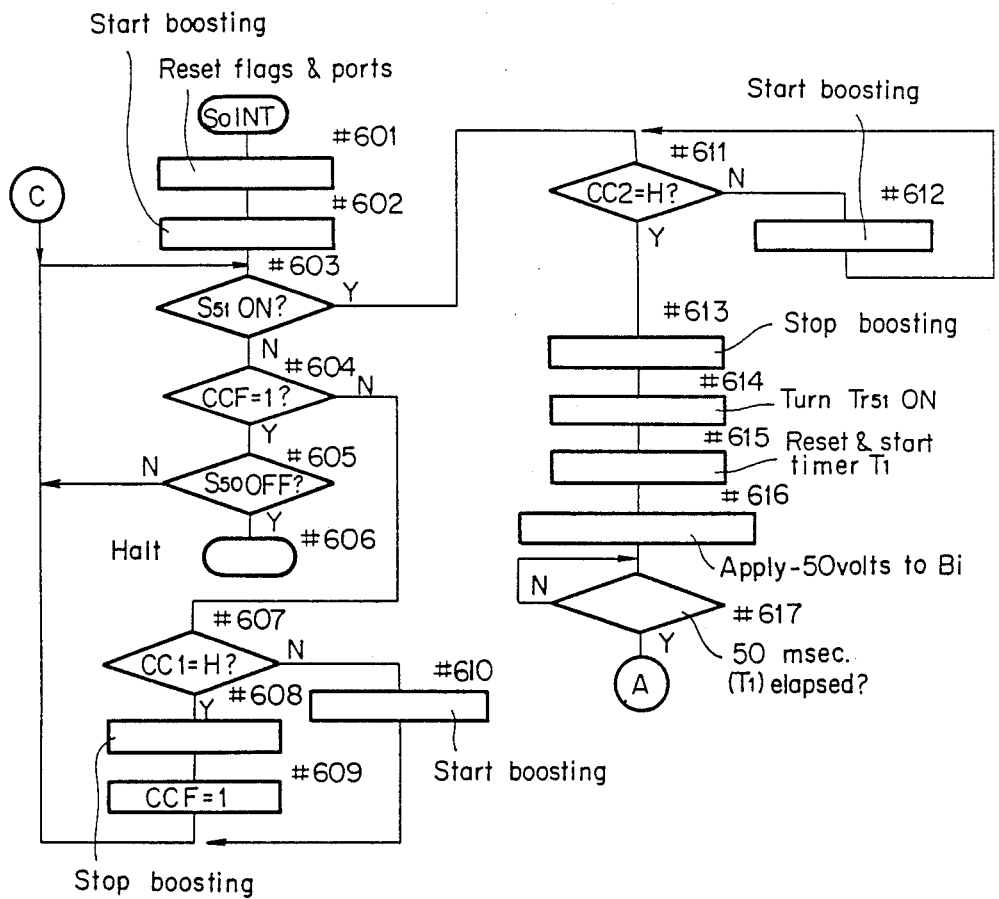
FIGS. 33a, 33b and 33c are flow charts of a routine illustrating a flow of operations of the camera of FIG. 29.
Figure 33B:
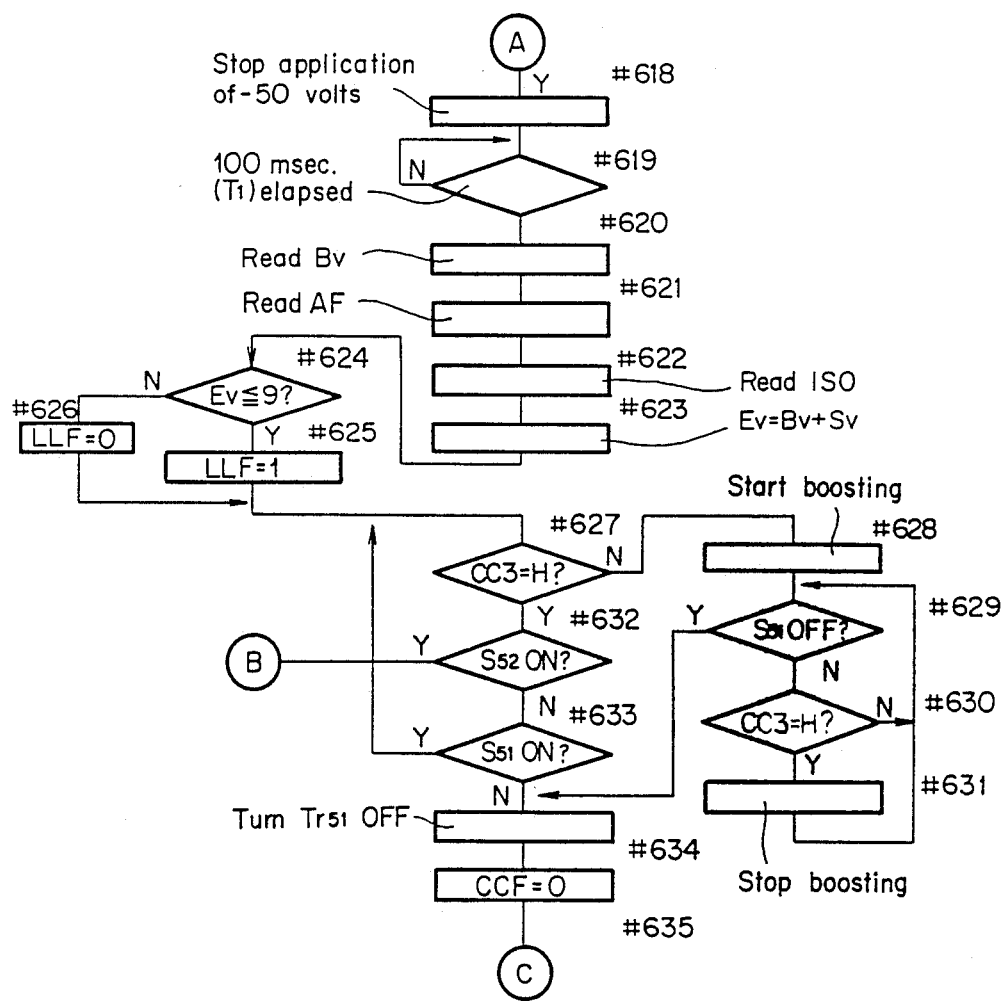
Figure 33C:
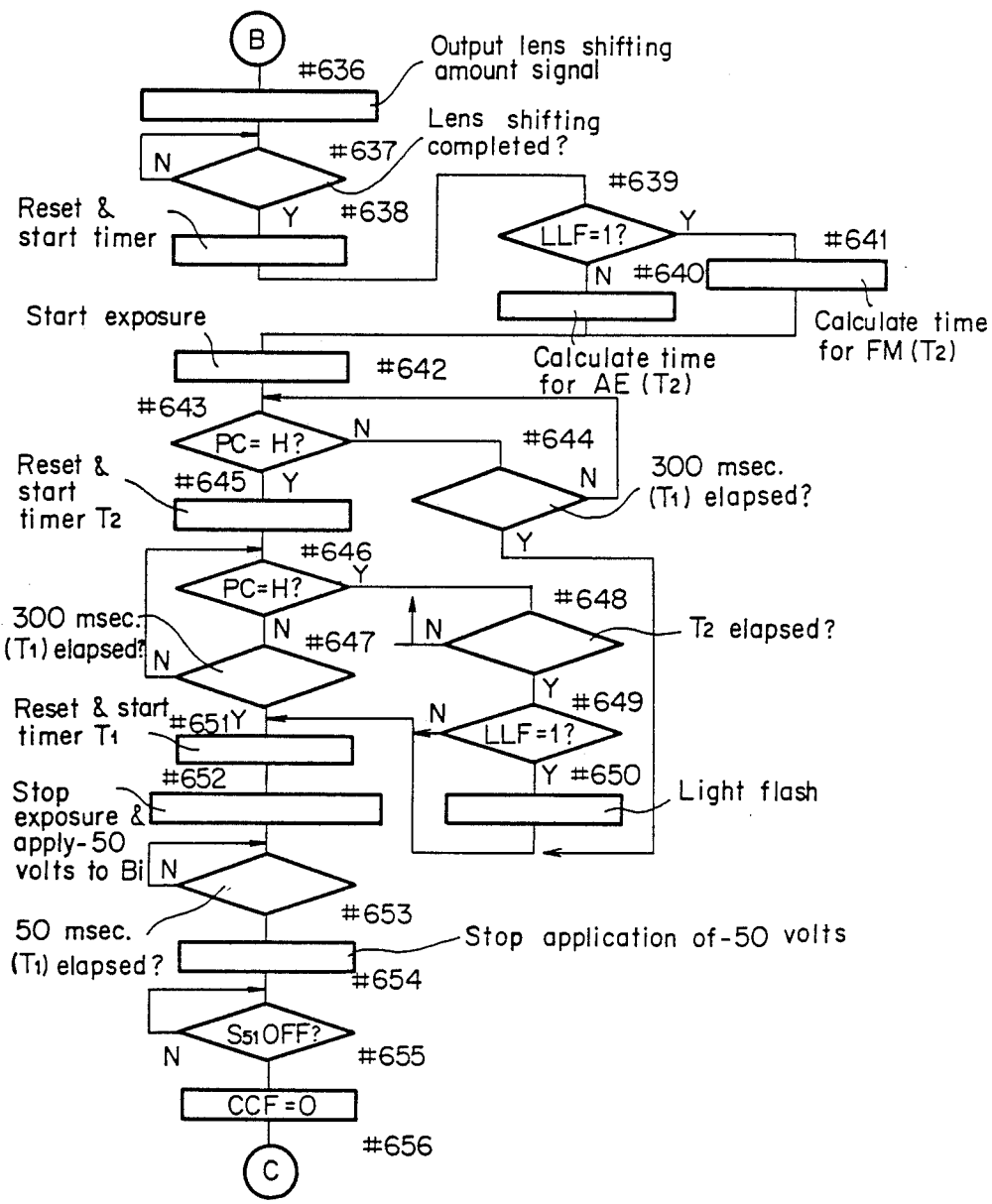

A main switch $S_{50}$ is connected to the microcomputer 61 and is turned on and off if, for example, a lens cover not shown is opened and closed, respectively. As the main switch $S_{50}$ is turned on, an interrupt routine as illustrated in flow charts of FIGS. 33a, 33b and 33c is executed. A photographing preparing switch $S_{51}$ is turned on when a release button not shown is depressed to a first stroke or depth, and as the switch $S_{51}$ is turned on, the camera makes preparations for subsequent photographing, including photometry and measurement of a distance to an object. A release switch $S_{52}$ is turned on when the release button is depressed to a second stroke greater than the first stroke, and as the release switch $S_{52}$ is turned on, a photographing operation is carried out.

Figure 34:
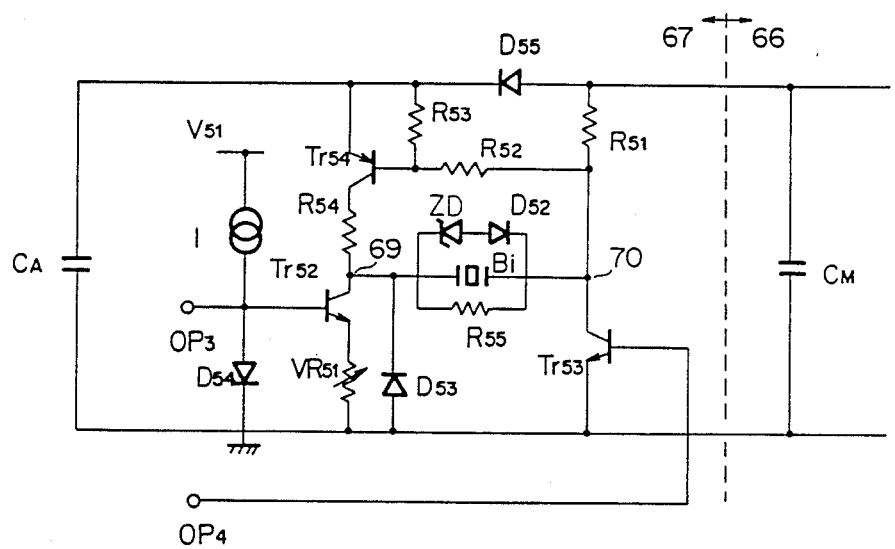
FIG. 34 is a circuit diagram showing detailed construction of a piezo-electric element driving circuit of the circuit of FIG. 32.

Referring now to FIG. 34, detailed construction of the piezo-electric actuating element driving circuit 67 is shown. The driving circuit 67 includes transistors $Tr_{52}$ to $Tr_{54}$, a Zener diode ZD, diodes $D_{51}$ to $D_{53}$, a piezo-electric actuating element Bi corresponding to the piezo-electric actuating element 58 cf FIG. 29, resistors $R_{51}$ to $R_{55}$, and a variable resistor $VR_{51}$ which cooperates with a constant-current regulated power source I and is adjusted to cause the transistor $Tr_{52}$ to provide a predetermined constant-current flow $I_1$ therefrom. An auxiliary capacitor $C_A$ is connected so that a reverse voltage equal to or higher than 50 volts may be applied across the piezo-electric actuating element Bi even if the voltage of a main capacitor $C_M$ included in the flash circuit 66 becomes lower than a predetermined voltage of 50 volts as a result of lighting of the flash device. A reverse charging preventing diode $D_{55}$ is connected to prevent a charge of the capacitor $C_A$ from flowing to the flash device.

Operation of the piezo-electric actuating element driving circuit 67 will now be described. At first, operation of the circuit 67 when the piezo-electric actuating element Bi is to be driven to open the shutter will be described. When no signal is received from the microcomputer 61, a voltage across the piezo-electric actuating element Bi, that is, between points 69 and 70 of the circuit 67 in FIG. 34, is equal to a voltage supplied from the flash circuit 66. In this state, if a signal of a high (H) level instructing opening of the shutter is received from a terminal $OP_3$ of the microcomputer 61, the transistor $Tr_{52}$ is turned on. As a result, a capacitor component of the piezo-electric actuating element Bi is charged with a constant-current flow $I_1$ so that the voltage across the piezo-electric actuating element Bi increases gradually to open the shutter. Here, resistances of the resistors $R_{52}$, $R_{53}$ should be selected, based on a voltage across the piezo-electric actuating element Bi produced by the resistor $R_{51}$ and the constant-current flow $I_1$, so that the transistor $Tr_{54}$ may not be turned on by the voltage. In this instance, the voltage at the point 69 is lower than the voltage at the point 70. Therefore, in order to prevent electric current from flowing through the Zener diode ZD, the diode $D_{52}$ is connected in a direction shown in FIG. 34 in series to the Zener diode ZD.

Now, operation of the piezo-electric actuating element driving circuit 67 when a reverse voltage is to be applied to the piezo-electric actuating element Bi will be described. Such a reverse voltage is applied twice to the piezo-electric actuating element Bi: it is applied for the first time when the photographing preparing switch $S_{51}$ is turned on, and for the second time when the shutter is to be closed. In either case, signals of an H level are delivered from terminals $OP_3$, $OP_4$, respectively, of the microcomputer 61 to turn on the transistors $Tr_{52}$, $Tr_{53}$, respectively. As the transistor $Tr_{53}$ is turned on, the transistor $Tr_{54}$ is turned on. Consequently, the voltage at the point 69 becomes higher than the voltage at the point 70. In this instance, a voltage between the points 69 and 70, that is, a voltage across the piezo-electric actuating element Bi, is determined by the Zener diode ZD, and here in the embodiment, the voltage is selected to be 50 volts. It will be appreciated that, in this instance, the signal from the terminal $OP_3$ of the microcomputer 61 may otherwise be at a low (L) level. It is to be noted that the diode $D_{53}$ is provided to prevent a negative voltage of a high magnitude from appearing at the point 69 directly after the transistor $Tr_{53}$ has been turned on and that the resistor $R_{55}$ is provided to prevent a voltage from being applied to the piezo-electric actuating element Bi when leak current may flow from the point 69 to the ground in order to prevent the shutter from being opened when the camera is inoperative.

On the other hand, the flash circuit 66 may be regarded as a composite circuit of the boosting circuit 5 and, for example, the exposure controlling circuit 9 of the first embodiment shown in FIG. 8 and may include a DC-DC converter, a capacitor for accumulating therein electric current from the converter, a detecting circuit for detecting a voltage across the capacitor, a trigger circuit for causing the capacitor to discharge an accumulated charge, and a xenon tube. In the flash circuit 66 of such a construction, the detecting circuit may be constituted to detect voltages of 250, 100 and 200 volts and deliver, when such voltages are detected, charging completion signals CC1, CC2 and CC3 of an H level from respective terminals thereof. In this instance, for detection of the voltage of 100 volts, only a voltage higher than 50 volts is necessary because the voltage of 50 volts is used as a reverse voltage to the piezo-electric actuating element Bi as described hereinabove in connection with the piezo-electric actuating element driving circuit 66. On the other hand, the voltage of 200 volts is a voltage necessary for the piezo-electric actuating element Bi to be driven sufficiently until the shutter is opened to reach an allowable maximum exposure aperture and also for the flash device to be driven to emit flash light.

Subsequently, operation of the camera described above will be described with reference to FIGS. 33a to 33c.

Figure 32:
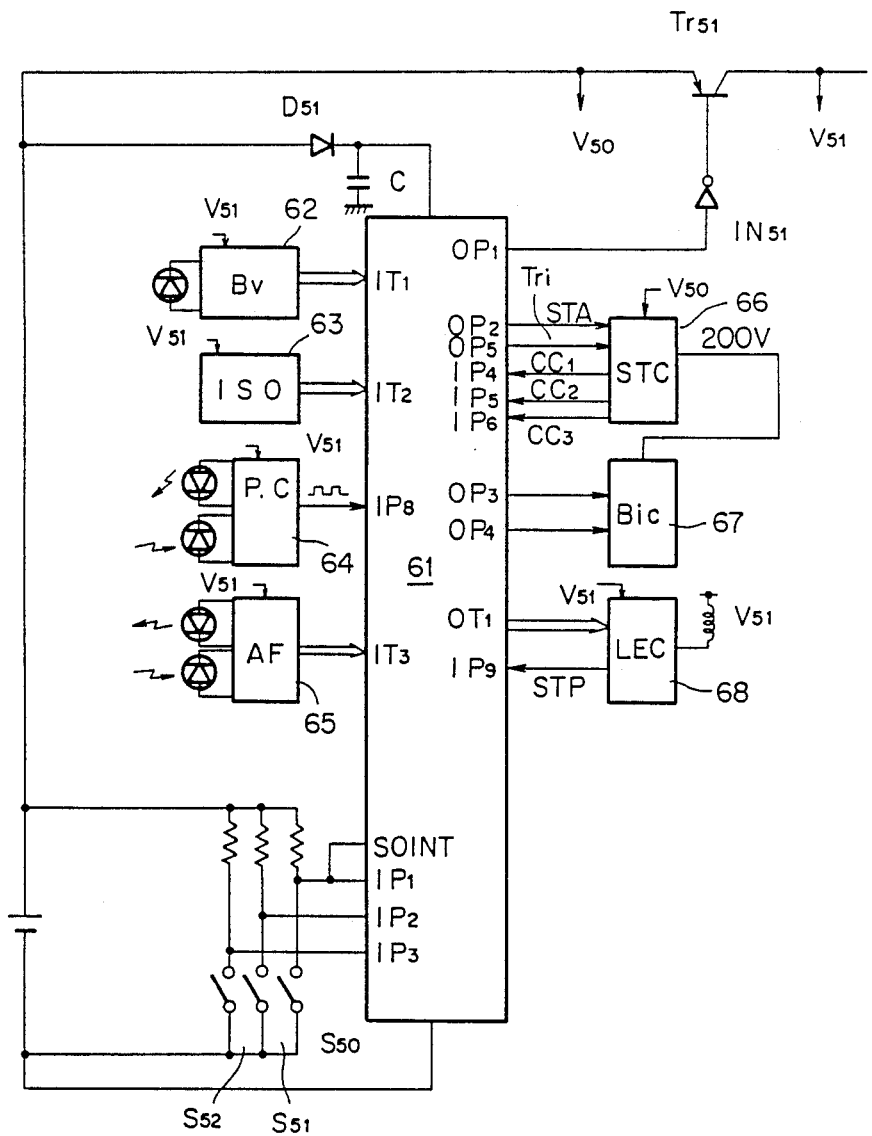
FIG. 32 is a block diagram showing an electric circuit of the camera of FIG. 29.

If the main switch $S_{50}$ shown in FIG. 32 is turned on, a signal changing from an H level to an L level is received by a terminal $S_0INT$ of the microcomputer 61. Upon reception of the signal, the microcomputer 61 executes a program which is illustrated in flow charts of FIGS. 33a to 33c.

Referring first to FIG. 33a, the microcomputer 61 at first resets flags and ports thereof at step #601, and then at #602, it delivers from a terminal $OP_2$ thereof a boosting starting signal STA of the H level to cause the flash circuit 66 to start boosting. Upon reception of the signal STA, the flash circuit 66 thus starts its boosting operation. Then at #603, the microcomputer 61 checks a level at a terminal $IP_2$ thereof to determine whether or not the photographing preparing switch $S_{51}$ is on, and if the level is "H", then the microcomputer 61 determines that the photographing preparing switch $S_{51}$ is off and advances the program to #604 at which it determines whether or not a flag CCF indicating whether or not the voltage across the capacitor $C_M$ of the flash circuit 66 is equal to or higher than 250 volts, in other words, whether or not the capacitor $C_M$ has been charged up to 250 volts, is in a set state. If the flag CCF is in the set state, then the microcomputer 61 checks, at #605, a level at a terminal $IP_1$ thereof to determine whether the main switch $S_{50}$ is off. In case the terminal $IP_1$ is at the "H" level, the microcomputer 1 determines that the main switch $S_{50}$ is off and thus stops its operation (#606). On the contrary, if the terminal $IP_1$ is at the "L" level at #605, the microcomputer 1 determines that the main switch $S_{50}$ is on and thus returns the program to

603 at which it waits until the photographing preparing switch S51 is operated.

Meanwhile, in case the flag CCF indicating completion of charging up of the capacitor $C_M$ of the flash circuit 66 is not in the set state at #604, the program advances to #607 at which a level of the signal CC1 from the flash circuit 66 is checked to determine the charged voltage of the capacitor $C_M$ is equal to or higher than 250 volts. Here, if the signal CC1 is at the "L" level, the microcomputer 61 determines that the voltage of 250 volts is not yet reached and thus starts boosting at #610 whereafter the program returns to #603. On the contrary, if the signal CC1 is at the "H" level at #607, the microcomputer 61 determines that the voltage of 250 volts is reached and thus stops boosting at #608 and then sets a flag CCF indicating completion of the charging up of the capacitor $C_M$ to "1" at #609. After then, the program returns to #603. Accordingly, when the main switch S50 is on and the photographing preparing switch S51 is not on or when the release button is brought out of a depressed condition, boosting is carried out only once.

On the other hand, in case the photographing preparing switch S51 is on at #603, the program advances to #611 at which a level of the signal CC2 from the flash circuit 66 is checked to determine whether the charged voltage is equal to or higher than 100 volts. In case the signal CC2 is at the "L" level, the microcomputer 61 determines that the voltage of 100 volts is not yet reached and thus delivers, at #612, a signal STA of the "H" level in order to start or continue boosting. After then, the program returns to #611 in order to wait the capacitor $C_M$ to be charged to the voltage of 100 volts. Thus, in case it is detected at #611 that the voltage 100 volts is reached, the signal STA is changed, at #613, into the "L" level to stop boosting. Subsequently at #614, the microcomputer 61 changes a terminal OP1 thereof into the "H" level to turn the power supply transistor Tr51 on to start the power supply to the several circuits connected to the same. Thereupon, the photometry circuit 62 and the distance measuring circuit 65 start their operation. Then at #615, the microcomputer 61 resets and starts operation of an internal timer T1 thereof. The timer T1 provides a voltage application time during which a reverse voltage is to be applied to the piezo-electric actuating element Bi (58 in FIG. 29) for actuating the shutter blades 51, 52 in order to set the same to its home position to attain a following end.

Figure 35:
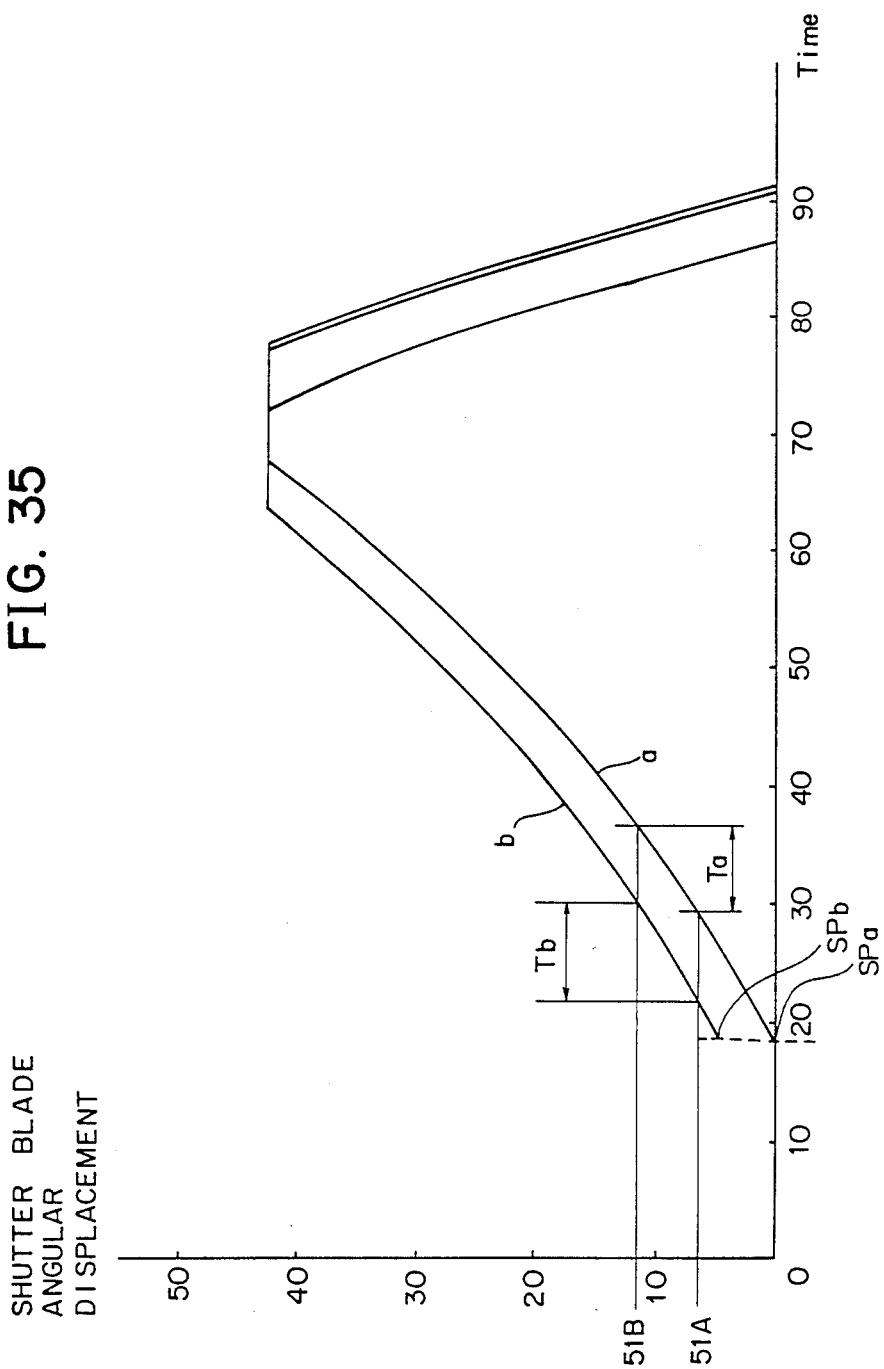
FIG. 35 is a graph illustrating characteristics of opening of a shutter relative to a time of application of a voltage to a piezo-electric element of FIG. 34.

Referring to FIG. 35, there are shown characteristics of opening of a shutter which also acts as an aperture design relative to a time of application of a voltage to the piezo-electric actuating element Bi. In FIG. 35, the axis of abscissa indicates a time of voltage application, and the axis of ordinate indicates opening (angular displacement) of the shutter blades. In the present embodiment, the piezo-electric actuating element Bi is charged with a constant-current flow. Accordingly, the voltage of the piezo-electric actuating element Bi increases in proportion to the time of voltage application. Therefore, the axis of abscissa may indicate the voltage of the piezo-electric actuating element Bi. In FIG. 35, a curve ⓐ indicates opening of the shutter when the piezo-electric actuating element Bi for actuating the shutter is actuated or started from a specific or predetermined home position denoted at SPa which corresponds to a position of the piezo-electric actuating element 58 where the shutter blade 51 is stopped by the pin 54e, and a curve ⓑ indicates an opening characteristic of the shutter when the piezo-electric actuating element Bi is actuated or started from a position denoted at SPb which is displaced from the home position SPa. During a period of time $T_1$ of about 20 msec. from starting of application of the voltage to Bi, while the piezo-electric actuating element Bi urges the shutter blades, a force of statical friction of the shutter blades prevails over an urging force of the piezo-electric actuating element Bi, and hence the shutter remains at its initial position. After the time $T_1$ has elapsed, the piezo-electric actuating element Bi starts its deformation and operation to actuate the shutter blades. Thus, as time passes and hence the charged voltage of the piezo-electric actuating element Bi increases, the shutter blades are displaced progressively. In this instance, the amount of displacement of the shutter blades is irrespective of at which position the piezo-electric actuating element Bi is positioned and is a function of a time of voltage application to the piezo-electric actuating element Bi where the voltage applied is constant. Accordingly, the shapes of the two curves ⓐ, ⓑ are similar to each other as seen in FIG. 35.

Now, examination is made here of a case wherein the exposure value corresponds to a minimum aperture diameter. In FIG. 35, the period of time required to move the shutter blades from a first predetermined position at which the small hole 51A of the shutter blade 51 is detected by the optical detecting element 59 to start measurement of the exposure time to a second predetermined position at which the shutter blades provide a minimum opening at which at least photographing is allowed is represented by Ta where the shutter blades are actuated from the home position and by Tb where the shutter blades are actuated from a position displaced from the home position. Because opening of the shutter progressively increases as the time of voltage application to the piezo-electric actuating element Bi passes, the time Tb is greater than the time Ta, that is Tb>Ta. Accordingly, the shutter speed (or opening time) varies depending upon from which position the piezo-electric actuating element Bi and hence the shutter blades are actuated, and such variation of the shutter speed will result in an error in exposure. In the present embodiment, since the exposure is controlled by the opening time of the shutter, the diameter of the aperture varies depending upon an initial position of the piezo-electric actuating element, which will also result in an error in exposure. It is to be noted, however, that the opening time of the shutter will vary where an exposure value is selected which corresponds to an aperture of the minimum opening.

In this manner, actuation of the piezo-electric actuating element Bi from a position displaced from its home position will apparently result in an error in exposure. Therefore, in order to prevent this, a reverse voltage is applied to the piezo-electric actuating element Bi to once set the same to its home position.

Referring back to FIG. 33a, after starting of operation of the timer $T_1$ for reverse voltage application to the piezo-electric actuating element Bi at #615, the microcomputer 61 changes, at #616, the terminals OP3, OP4 thereof into the "H" level to cause the driving circuit 67 to apply a voltage of −50 volts across the piezo-electric actuating element Bi (a voltage at the point 70 is lower than a voltage at the point 69, FIG. 34). Such application of the negative voltage continues for a period of time of 50 msec. (#617), and during the period of time, the shutter blades 51, 52 are pivoted in the aperture closing direction until the shutter blade 51 is engaged with and stopped by the pin 54e. The shutter blades 51, 52 maintain the stopped positions until they are subsequently pivoted in the aperture opening direction.

Referring now to FIG. 33b, after the time of 50 msec. has passed at the timer $T_1$, the microcomputer 61 changes, at #618, the terminals $OP_3$, $OP_4$ thereof into the "L" level to stop the application of the reverse voltage of 50 volts. Subsequently at #619, the microcomputer 61 waits until a time of 100 msec. elapses at the timer $T_1$ (as measured from step #615). This time of 100 msec. is selected in order to assure that a photometric operation and a distance measuring operation are completed by the photometry circuit 62 and the distance measuring circuit 65, respectively. After lapse of the time of 100 msec., the microcomputer 61 reads, successively at steps #620, #621 and #622, a brightness value Bv, a measured distance value and a film sensitivity Sv from the photometry circuit 62, the distance measuring circuit 65 and the film sensitivity reading circuit 63, respectively, and then calculates, at #623, an exposure value Ev using an equation Ev=Bv+Sv. Then at #624, the exposure value Ev is discriminated whether it is equal to or greater than "9", and if it is smaller than "9", then a flag LLF indicating a low brightness is reset to "0" at #625, but on the contrary if the exposure value Ev is greater than "9", the flag LLF is reset to "0" at #626. Subsequently at #627, the microcomputer 61 checks a level at a terminal $IP_6$ thereof, that is, a signal CC3, to detect whether the capacitor $C_M$ of the flash circuit 66 is charged to a voltage of 200 volts required to actuate the piezo-electric actuating element Bi by a predetermined amount. If the terminal $IP_6$ is at the "H" level which indicates the capacitor $C_M$ is charged up to 200 volts, the microcomputer 61 determines that the camera is ready for releasing of the shutter, that is, the shutter will open regularly, and then checks, at #632, a level at a terminal $IP_3$ thereof to determine whether or not the release switch $S_{52}$ is on. Here, if the release switch $S_{52}$ is on, that is, if the terminal $IP_3$ is at the "L" level, then the microcomputer 61 executes a sequence of release controlling steps beginning with #636 shown in FIG. 33c. To the contrary, if the release switch $S_{52}$ is not on at #632 and hence the terminal $IP_3$ is at the "H" level, then the microcomputer 61 detects at #633 whether or not the photographing preparing switch $S_{51}$ is on. In case the switch $S_{51}$ is on and hence the terminal $IP_2$ of the microcomputer 61 is at the "L" level, the program returns to #627, but on the contrary in case the switch $S_{51}$ is off and hence the terminal $IP_2$ is at the "H" level, the microcomputer 61 determines that the photographer has taken a hand off the release button to stop a photographing operation and thus changes, at #634, the terminal $OP_1$ into the "L" level to turn the power supply transistor $Tr_{51}$ off. Subsequently at #635, the microcomputer 61 resets the flag CCF indicating completion of charging of the capacitor $C_M$, and then returns the program to #603 in order to effect charging of the capacitor $C_M$ once again. On the other hand, if it is determined at #627 from the signal CC3 that the capacitor $C_M$ is not yet charged up to a voltage equal to or higher than 200 volts, the signal STA is changed, at #628, into the "H" level to start boosting, and then at #629, a state of the photographing preparing switch $S_{51}$ is checked to determine whether or not it has been turned off. In case the switch $S_{51}$ is off and hence the terminal $IP_2$ is at the "H" level, the microcomputer 61 determines either that no releasing operation is performed while the release button has been depressed to its second stroke or that the photographer has taken a hand off the release button in order to only stop a photographing operation, and thus advances the program to #634. On the contrary, if the photographing preparing switch $S_{51}$ is on and hence the terminal $IP_2$ is at the "L" level at #629, the signal CC3 is checked, at #630, to determine whether or not the charged voltage reaches 250 volts. Here, if the capacitor $C_M$ is charged up to a voltage equal to or higher than 250 volts and hence the terminal $IP_6$ is at the "H" level, then the signal STA is changed, at #631, into the "L" level to stop boosting whereafter the program returns to #629. On the other hand, if the capacitor $C_M$ is not yet charged up to 250 volts at #630 and hence the terminal $IP_6$ is at the "L" level, the program returns to #629 skipping #631. By such a sequence of operations as described above, the release of shutter is interrupted once when the charged voltage of the capacitor $C_M$ does not reach a voltage of 200 volts at which regular operation of the shutter is assured.

Referring now to FIG. 33c, at #636 to which the program advances from #632 of FIG. 33b when the release switch $S_{52}$ is on and hence the terminal $IP_3$ is at the "L" level, the microcomputer 61 delivers a lens shifting amount signal to the lens driving circuit 68. This signal includes information of a shifting amount of the lens required for shifting the lens to its in-focus position and serves also as a lens shifting start signal. Thus, upon reception of the signal, the lens driving circuit 68 drives or shifts the lens by such a specified amount or distance, and then when such shifting of the lens is completed, it develops a stopping signal STP of an "H" level. Upon reception of the stopping signal STP at #637, the microcomputer 61 resets and starts operation of the timer $T_1$ at #638. Here, the timer $T_1$ serves as a limiting timer used for prevention of an operation in error and provides a predetermined period of time within which a signal indicating the first or second predetermined position of the shutter blades is to be coupled to the microcomputer 61 in order that when such a signal is not received from the position detector 64 (optical detecting element 59 in FIG. 29) within the predetermined period of time of the timer $T_1$ by some reasons, for example, due to breaking of wire or trouble of a photocoupler of the optical detecting element, the shutter blades may be closed after lapse of the predetermined period of time.

Subsequently, at #639, the microcomputer 61 discriminates whether or not the flag LLF indicating a low brightness condition is in the set state, and if the flag LLF is in the set state, the microcomputer 61 calculates, at #640, an exposure time ($T_2$) corresponding to an aperture value providing appropriate exposure for flash photographing from the distance information received at #621 from the distance measuring circuit 65. On the contrary, if the flag LLF is not in the set state at #639, the microcomputer 61 calculates, at #641, from the exposure value Ev calculated at #623, an exposure time ($T_2$) corresponding to an aperture value providing appropriate exposure for photographing.

After completion of calculation of an exposure time at #640 or #641, the microcomputer 61 changes the terminal $OP_3$ thereof into the "H" level to start exposure, that is, movement of the shutter blades. Then, the microcomputer 61 waits for a time of 300 msec. at #644 until a position signal $PC_1$ indicating the first predetermined position of the shutter blades just before exposure is started, that is, a rising edge of a pulse, is received, at #643, at a terminal $IP_8$ of the microcomputer 61 from the position detector 64. In case no first position signal $PC_1$ is received within the time of 300 msec., the program advances to #651. On the other hand, in case the first position signal $PC_1$ is received within the time of 300 msec., the microcomputer 61 resets and starts operation of the exposure timer $T_2$ at #645. Subsequently, the microcomputer 61 waits, at #647, for a time of 300 msec. as measured from starting of operation of the timer $T_1$ at #638 until a second position signal $PC_2$ indicating the minimum opening position of the shutter blades at which at least photographing is allowed is received from the position detector 64 at #646. In case the second position signal $PC_2$ is received from the position detector 64, the microcomputer 61 waits until the exposure time calculated at #640 or #641 elapses at the timer $T_2$. During the exposure time, the shutter blades are pivoted in the aperture opening direction until the diameter of aperture diaphragx reaches a suitable value. After lapse of the exposure time, the microcomputer 61 checks, at #649, the flag LLF indicating a low brightness state. Here, if the flag LLF is in the set state, the microcomputer 61 delivers from a terminal $OP_5$ thereof a pulse signal Tri instructing lighting of the flash, and then the program advances to a sequence of shutter closing operations beginning with #651. Also where the flag LLF is not in the set state at #649, the program advances to #651 of the shutter closing sequence skipping #650.

Here, description is given of a reason why a signal instructing closing of the shutter is not started until the second position signal $PC_2$, that is, a minimum shutter opening signal, is received even if the exposure time ($T_2$) has elapsed. In the present embodiment, a piezo-electric actuating element also known as a bimorph is employed as a driving source of the shutter, had if its initial position is not fixed or stabilized as described hereinbefore, the opening speed of the shutter blades will not be stabilized and sometimes the shutter may not be opened at all during the exposure time ($T_2$). In order to prevent this, a shutter closing instruction is not started until a minimum shutter opening signal is received. It will be appreciated that the unstableness in opening speed of the shutter may be caused, in addition to the reason described hereinabove, by a fluctuation of the characteristic of the piezo-electric actuating element (relationship between a voltage and an opening characteristic), by a fluctuation of a driving force required to open the shutter due to a temperature, and by a fluctuation of such a driving force due to a difference in posture. It is to be noted that a shutter having such an unstable opening speed requires similar control.

Referring back to FIG. 33c, as described above, in case the second position signal $PC_2$, that is, a signal indicating a minimum shutter opening, is not received from the position detector 64 within the time of 300 msec., the microcomputer 61 determines that no second position signal $PC_2$ is produced from the position detector 64 by some reasons and thus advances the program to #651 in order to effect a shutter closing operation. At #651, the microcomputer 61 resets and starts operation of the timer $T_1$, and then at #652, it changes a terminal $OP_4$ into the "H" level to apply a reverse voltage of 50 volts to the piezo-electric actuating element Bi to close the shutter. Then at #653, the microcomputer 61 waits that the time of 50 msec. elapses at the timer $T_1$, and after lapse of 50 msec., the microcomputer 61 changes, at #654, the terminals $OP_3$, $OP_4$ into the "L" level to stop application of the reverse voltage of 50 volts to the piezo-electric actuating element Bi. After then, at #655, the microcomputer 1 waits until the photographing preparing switch $S_{51}$ is turned off to change the terminal $IP_2$ into the "H" level, and then when the switch $S_{51}$ is turned off, the charging completion flag CCF is reset to zero at #656, whereafter the program returns to #603 in order to charge up the capacitor $C_M$ of the flash circuit 66 after completion of the photographing to prepare for subsequent photographing.

Figure 36:
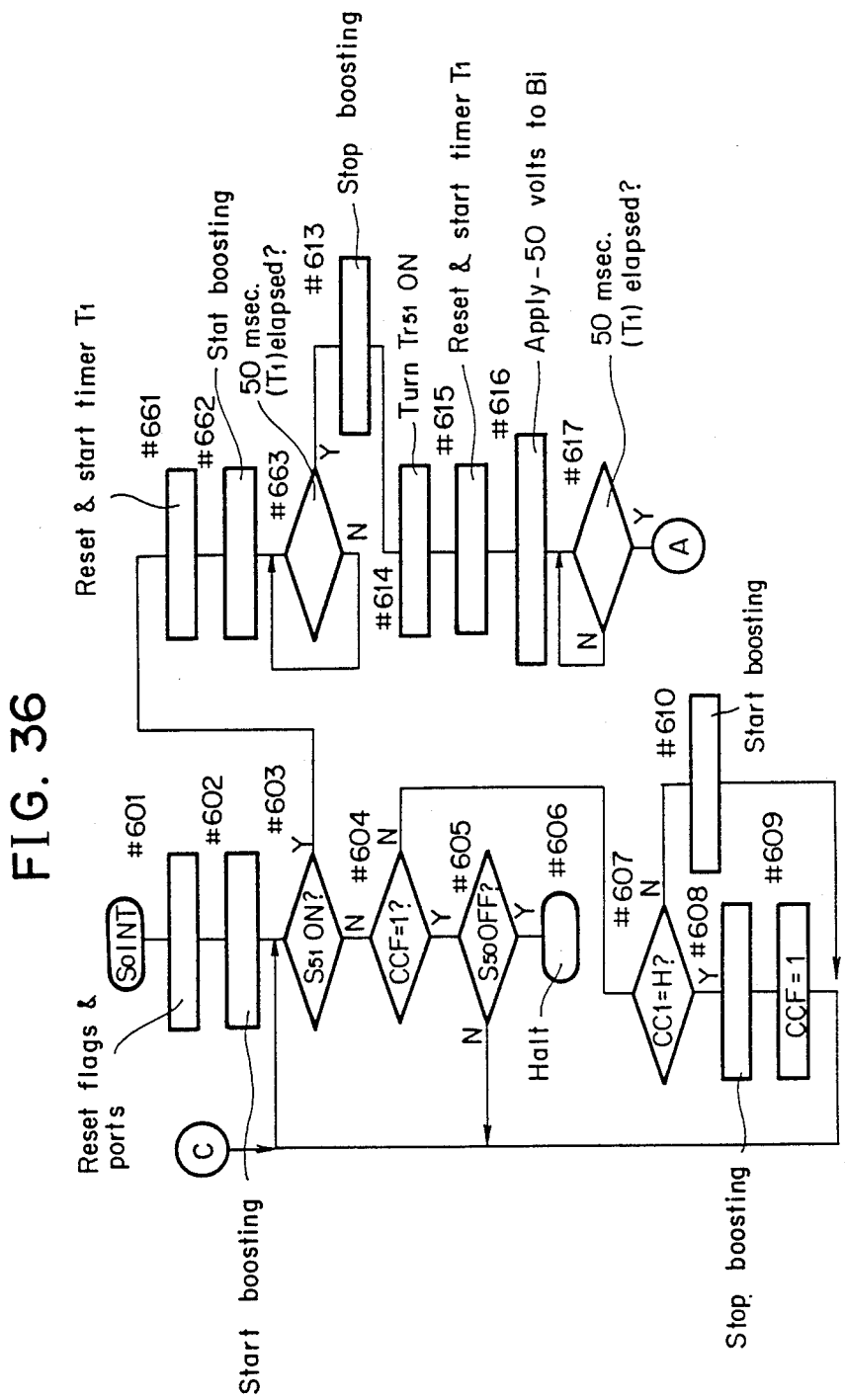

It is to be noted that while in the embodiment described above the capacitor $C_M$ of the flash circuit 66 is charged to a predetermined voltage (100 volts if the predetermined voltage is not yet reached just after the photographing preparing switch $S_{51}$ has been turned on, it may otherwise be charged during a predetermined time period each time the switch $S_{51}$ is turned on at #603. A flow chart of a program in which such modification is incorporated is shown in FIG. 36. The flow chart of FIG. 36 generally corresponds to the flow chart of FIG. 33a, and steps #611 and #612 in FIG. 33a are replaced by steps #661, #662 and #663 in FIG. 36. In particular, the microcomputer 61 resets and starts operation of the timer $T_1$ at #661, and then at steps #662 and #663, it causes the flash circuit 66 to start and continue boosting for a predetermined period of time (50 msec.) until the boosting is stopped subsequently at #613.

An alternative modification is also possible wherein boosting operation is effected just after the photographing preparing switch $S_{51}$ has been turned on. In this modification, the steps #611 and #613 of FIG. 33a should be omitted. In this instance, even if a reverse voltage is applied to the piezo-electric actuating element Bi when the capacitor $C_M$ for the piezo-electric actuating element Bi is not yet charged to a voltage of 50 volts, the piezo-electric actuating element Bi may not be set to its home position. In such a case, however, it is determined at #627 that the capacitor $C_M$ is not yet charged sufficiently, and hence the release of the shutter is interrupted to prevent a releasing operation. Accordingly, an operation in error (error in exposure) can be prevented.

It is to be noted that while in the present embodiment a brightness value is stored once into a memory and such a stored brightness value is recalled later in order to determine an exposure value, such a brightness value may otherwise be read on a real time basis from the photometry circuit 62. In this case, the photometry circuit 62 will begin its light measuring operation when the second position signal $PC_2$ is received from the position detector 64.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A camera, comprising:
   a power source;
   boosting means for boosting a voltage of said power source;

charging means for accumulating therein energy boosted by said boosting means;

piezo-electric means;

driven means connected to be actuated by said piezo-electric means, said driven means including a shutter for performing an exposure;

driving and controlling means for driving and controlling said piezo-electric means by energy accumulated in said charging means, said driving and controlling means including exposure controlling means for controlling said piezo-electric means so that an appropriate exposure amount may be obtained;

trigger means for starting operation of said driving and controlling means in response to an external operation;

voltage detecting means for detecting an accumulated voltage of said charging means before said external operation;

inhibiting means for inhibiting the operation of said driving and controlling means from starting when said voltage detecting means detects that the energy in said charging means is not accumulated up to a predetermined voltage; and allowing means for allowing the start of the operation of said driving and controlling means when said voltage detecting means detects that the energy in said charging means is accumulated up to the predetermined voltage thereby the operation of said driving and controlling means is started in response to said external operation so that the exposure is instantly performed in response to said external operation.

2. A camera, comprising:

a power source;

boosting means for boosting a voltage of said power source;

charging means for accumulating therein energy boosted by said boosting means;

voltage detecting means for detecting a charged voltage of said charging means;

piezo-electric means;

driven means connected to be actuated by said piezo-electric means;

driving and controlling means for driving and controlling said piezo-electric means by energy accumulated in said charging means;

trigger means operable in response to manual operation thereof for producing a photographing starting instruction signal instructing starting of a photographing operation;

photographing controlling means operable in response to said photographing starting instruction signal for causing said piezo-electric means to actuate said driven means;

light metering means for metering light of a scene to be photographed; and controlling means for causing said voltage detecting means to detect a charged voltage of said charging means after a termination of the light metering operation and for causing said boosting means to charge said charging means until it is detected that said charging means is charged to a predetermined voltage.

3. A camera according to claim 2, wherein said charging means accumulates the energy only when the accumulated energy is less than a predetermined voltage.

4. A camera according to claim 3, wherein said controlling means includes inhibiting means for inhibiting starting of a photographing operation when the charged voltage of said charging means detected by said voltage detecting means is lower than the predetermined voltage.

5. A camera according to claim 2, further comprising photographing preparation starting means for producing a photographing preparation instructing signal to start a photographing preparing operation prior to a photographing starting instruction signal from said starting means, said controlling means operating until a photographing starting instruction signal is produced after a photographing preparation instructing signal has been produced.

6. A camera comprising:

a power source;

boosting means for boosting a voltage of said power source;

charging means for accumulating therein energy boosted by said boosting means;

voltage detecting means for detecting a charged voltage of said charging means;

piezo-electric means;

driven means connected to be actuated by said piezo-electric means;

driving and controlling means for driving and controlling said piezo-electric means by energy accumulated in said charing means;

light metering means for metering light of a scene to be photographed;

trigger means operable in response to manual operation thereof for producing a photographing preparation starting instruction signal instructing starting of a light metering operation; and photographing controlling means for causing said boosting means to operate in response to said photographing preparation starting instruction signal and for starting a photographing preparation operation when the charged voltage of said charging means detected by said voltage detecting means reaches a predetermined voltage.

7. A camera according to claim 6, wherein said light metering means starts a light metering operation after a termination of the accumulation of energy.

8. A camera, comprising:

a power source;

boosting means for boosting a voltage of said power source;

charging means for accumulating therein energy boosted by said boosting means;

voltage detecting means for detecting a charged voltage of said charging means;

piezo-electric means;

a photographing lens having a focusing lens movable along an optical axis of the photographing lens for focusing thereof;

driven means connected to be actuated by said piezo-electric means, said driving means including a shutter for performing an exposure and said driven means including lens actuating means for controlling the position of said focusing lens in a direction of the optical axis of said photographing lens;

driving and controlling means for driving and controlling said piezo-electric means by energy accumulated in said charging means, said driving and controlling means including exposure controlling means for controlling said piezo-electric means so that an appropriate exposure amount may be obtained and said driving and controlling means including focusing means for controlling said piezo-electric means to adjust said photographing lens into an in-focus condition;
trigger means for starting operation of said driven means, said trigger means including release means for starting operation of said shutter by said exposure controlling means; and
inhibiting means for inhibiting operation of said driven means from being started by said trigger means until said voltage detecting means detects that said charging means is charged up to a predetermined voltage, said inhibiting means including shutter operation inhibiting means for inhibiting starting of operation of said shutter.

9. A camera, comprising:
a power source;
boosting means for boosting a voltage of said power source;
charging means for accumulating therein energy boosted by said boosting means;
piezo-electric means;
driven means connected to be actuated by said piezo-electric means, said driving means including a shutter for performing an exposure;
driving and controlling means for driving and controlling said piezo-electric means by energy accumulated in said charging means, said driving and controlling means including exposure controlling means for controlling said piezo-electric means so that an appropriate exposure amount may be obtained;
trigger means for starting operation of said driving and controlling means and starting the boosting of said boosting means and the accumulating of the charging means, in response to an external operation for the exposure;
voltage detecting means for detecting the accumulated voltage of said charging means;
inhibiting means for inhibiting the operation of said driving and controlling means while allowing the boosting and the accumulating when the voltage detecting means detects that the energy in said charging means is not accumulated up to a predetermined voltage; and
means for stopping the boosting when said detecting means detects that the energy in said charging means is accumulated up to the predetermined voltage and subsequently starting the operation of said driving and controlling means thereby performing the exposure.

10. A camera, comprising:
a power source;
first boosting means for boosting a voltage of said power source;
first charging means for accumulating therein energy boosted by said first boosting means;
first voltage detecting means for detecting a charged voltage of said first charging means;
piezo-electric means;
driven means connected to be actuated by said piezo-electric means, said driven means including a shutter for performing an exposure;
driving and controlling means for driving and controlling said piezo-electric means by energy accumulated in said first charging means, said driving and controlling means including exposure controlling means for controlling said piezo-electric means so that an appropriate exposure amount may be obtained;
trigger means for starting operation of said driven means, said trigger means including release means for starting operation of said shutter by said exposure controlling means;
second boosting means for boosting the voltage of said power source;
second charging means for accumulating therein energy boosted by said second boosting means;
second voltage detecting means for detecting a charged voltage of said second charging means;
electronic flash means for emitting flash light by the energy accumulated in the second charging means;
switching means for switching a photographic mode between a first mode in which said electronic flash means emits flash light and a second mode in which said electronic flash means does not emit flash light; and
inhibiting means for inhibiting said driven means from starting its operation when said first voltage detecting means detects that the energy in said first charging means is not accumulated up to a predetermined voltage under the second mode and when at least said second voltage detecting means detects that the energy in said second charging means is not accumulated up to a second predetermined voltage under the first mode.

11. A camera according to claim 10, wherein said inhibiting means inhibits said driven means from starting its operation when said first voltage detecting means detects that the energy in said first charging means is not accumulated up to the first predetermined voltage under the first mode.

12. A camera according to claim 10, wherein said first and second boosting means means consist of a common circuit.

13. A camera, comprising:
first charging means for accumulating electrical energy therein;
second charging means for accumulating electrical energy therein;
piezo-electric means operable with the energy in said first charging means for driving a shutter of the camera;
exposure control means for controlling the operation of said piezo-electric means for performing an exposure;
electronic flash means for emitting flash light with the energy in said second charging means;
switching means for switching a photographic mode between a first mode in which said electronic flash means emits flash light and a second mode in which said electronic flash means does not emit flash light; and
inhibiting means for inhibiting said exposure control means from starting its operation when the energy accumulated in said first charging means is not sufficient under the second mode and when the energy accumulated in at least one of said charging means is not sufficient under the first mode.

14. A camera, comprising:
piezo-electric means for driving a shutter;
electronic flash means for emitting flash light;
supplying means for supplying an energy to said piezo-electric means for driving the shutter and to said electronic flash means for emitting the flash light;

exposure control means for controlling the operation of said piezo-electric means for performing an exposure;

switching means for switching a photographic mode between a first mode in which said electronic flash means emits flash light and a second mode in which said electronic flash means does not emit flash light; and inhibiting means for inhibiting said exposure control means from starting exposure when the energy supplied by said supplying means is not sufficient for moving said piezo-electric means appropriately under the second mode and when the energy supplied by said supplying means is not sufficient for emitting the flash light as well as for moving said piezo-electric means appropriately under the first mode.

* * * * *